US010584048B2

(12) United States Patent
Hernandez Altamirano et al.

(10) Patent No.: US 10,584,048 B2
(45) Date of Patent: Mar. 10, 2020

(54) PROCESS TO OBTAIN RANDOM COPOLYMERS DERIVED FROM ITACONIC ACID AND/OR ITS ISOMERS AND SODIUM ALKENYL SULFONATES AND USE OF THE PRODUCT THEREOF

(71) Applicant: INSTITUTO MEXICANO DEL PETROLEO, Mexico City (MX)

(72) Inventors: Raul Hernandez Altamirano, Mexico City (MX); Violeta Yasmin Mena Cervantes, Mexico City (MX); Luis Silvestre Zamudio Rivera, Mexico City (MX); Erick Emanuel Luna Rojero, Mexico City (MX); Jose Manuel Martinez Magadan, Mexico City (MX); David Aaron Nieto Alvarez, Mexico City (MX); Mirna Pons Jimenez, Mexico City (MX); Alejandro Ramirez Estrada, Mexico City (MX); Maria del Pilar Arzola Garcia, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 665 days.

(21) Appl. No.: 14/260,746

(22) Filed: Apr. 24, 2014

(65) Prior Publication Data
US 2014/0319063 A1    Oct. 30, 2014

(30) Foreign Application Priority Data
Apr. 25, 2013   (MX) .................. MX/a/2013/004644

(51) Int. Cl.
  *C08F 222/02*   (2006.01)
  *C08F 228/02*   (2006.01)
  *C02F 5/10*     (2006.01)
  *C08F 4/40*     (2006.01)

(52) U.S. Cl.
  CPC .............. *C02F 5/10* (2013.01); *C08F 222/02* (2013.01); *C08F 228/02* (2013.01); *C08F 4/40* (2013.01)

(58) Field of Classification Search
  CPC ........ C02F 5/10; C08F 222/02; C08F 228/02; C08F 4/40; C08F 2/10
  See application file for complete search history.

(56) References Cited

U.S. PATENT DOCUMENTS

| 2,358,222 | A |  | 9/1944 | Fink et al. |
| 3,886,205 | A |  | 5/1975 | Geffers et al. |
| 3,974,090 | A |  | 8/1976 | Mitchell |
| 4,331,792 | A |  | 5/1982 | Goretta et al. |
| 4,673,508 | A |  | 6/1987 | Coleman et al. |
| 4,710,303 | A |  | 12/1987 | Emmons |
| 4,728,445 | A | * | 3/1988 | Hale .................. C09K 8/24 507/119 |
| 4,929,632 | A |  | 5/1990 | Tyers et al. |
| 5,089,150 | A |  | 2/1992 | Hen |
| 6,924,253 | B2 |  | 8/2005 | Palmer et al. |
| 7,306,035 | B2 |  | 12/2007 | Collins et al. |
| 8,215,398 | B2 |  | 7/2012 | Kesavan et al. |
| 2002/0150499 | A1 |  | 10/2002 | Reizer et al. |
| 2005/0282712 | A1 |  | 12/2005 | Crossman et al. |
| 2007/0267193 | A1 |  | 11/2007 | Hills et al. |
| 2010/0163494 | A1 |  | 7/2010 | Bodnar et al. |
| 2011/0224393 | A1 | * | 9/2011 | Durant .................. C08F 22/02 526/318.2 |

FOREIGN PATENT DOCUMENTS

| CN | 101830571 | * | 9/2010 |
| EP | 0267597 |  | 5/1988 |
| EP | 0256057 |  | 4/1993 |
| EP | 0976911 |  | 2/2000 |
| EP | 1639228 |  | 4/2008 |

OTHER PUBLICATIONS http://www.aqion.de/site/192; pH of Organic Acids and Salts; 2017.*
CN 101830571, machine translation of claims and description, Sep. 2010.*
https://web.archive.org/web/20121125002611/https://en.wikipedia.org/wiki/Copolymer; 2012.*
De Jager, H.J. et al., Kinetics of Acid-Catalyzed Hydrolysis of a Polyphosphate in Water, J. Phys. Chem. A 1998, 102, 2838-2841.
Boffardi, B.P. et al., The Chemistry of Polyphosphate, Materials Performance, 50, 1993.

(Continued)

*Primary Examiner* — Roberto Rabago
(74) *Attorney, Agent, or Firm* — Dickinson Wright PLLC

(57) ABSTRACT

A process for obtaining random copolymers from itaconic acid and/or isomers and sodium alkenyl sulfonates is by polymerization in an aqueous solution via free radicals at an acidic pH in the range from 1.0 to 3.5 and with a redox system as initiator. The copolymers can be used as calcium carbonate and calcium, strontium and barium sulfates mineral scale inhibitors and as dispersants of clays, iron oxides, calcium carbonate and strontium, barium and calcium sulfates. Random copolymers prevent and control damage in an oil reservoir, obstruction of water injection and crude oil production pipelines, and in production rigs due to mineral scale precipitation caused by high levels of salinity of the injection water and formation water. Random copolymers are tolerant to high concentrations of divalent ions, such as calcium, magnesium, strontium and barium, and can be added to the reservoir and to injection or production pipelines, treated water, sea water and water that is used as means of transportation. The copolymers can also be used to inhibit and disperse mineral scale occurring in cooling systems and boilers used in the oil and chemistry industry.

13 Claims, 21 Drawing Sheets

(56) References Cited

OTHER PUBLICATIONS

Geiger, G., New Non-Phosphorous Calcium Carbonate Inhibitor Reduces Phosphorus Levels and Overcomes Limitations of Phosphonates, Water & Process Technology, 2006, 1-7.

Brown, J. et al., Development of an Environmentally Acceptable Cooling Water Treatment Program: Non-Phosphorus Scale Inhibitor, Corrosion/93, Paper No. 463, 1993.

Wang, W. et al., A Novel and Comprehensive Study of Polymeric and Traditional Phosphonate Inhibitors for High Temperature Scale Control, SPE 155108, 2012, 1-16.

Browning, F. et al., Effect of Synthesis Parameters on the Properties of Calcium Phosphonate Precipitates, Langmuir 1995, 11, 4143-4152.

Demadis, K. et al., Degradation of Phosphonate-Based Scale Inhibitor Additives in the Presence of Oxidizing Biocides: "Collateral Damages" in Industrial Water Systems, Separation Science and Technology, 42: 1639-1649, 2007.

Tribello, G. et al., Binding of Calcium and Carbonate to Polyacrylates, J. Phys. Chem. B 2009, 113, 7081-7085.

Naka, K. et al., Control of Crystal Nucleation and Growth of Calcium Carbonate by Synthetic Substrates, Chem. Mater. 2001, 13, 3245-3259.

Coveney, P. et al., A New Design Strategy for Molecular Recognition in Heterogeneous Systems: A Universal Crystal-Face Growth Inhibitor for Barium Sulfate, J. Am. Chem. Soc. 2000, 122, 11557-11558.

Estroff, L. et al., At the Interface of Organic and Inorganic Chemistry: Bioinspired Synthesis of Composite Materials, Chem. Mater. 2001, 13, 3227-3235.

Jiang, Y. et al., Cornucopian Cylindrical Aggregate Morphologies from Self-Assembly of Amphiphilic Triblock Copolymer in Selective Media, J. Phys. Chem. B 2005, 109, 21549-21555.

Jian, F. et al., Density Functional Calculations, Synthesis, and Characterization on Two Novel Quadruple Hydrogen-Bonded Supramolecular Complexes, J. Phys. Chem. A 2004, 108, 5258-5267.

Norrby, P.O. et al., Strong Decrease of the Benzene-Ammonium Ion Interaction upon Complexation with a Carboxylate Anion, J. Am. Chem. Soc. 1999, 121, 2303-2306.

\* cited by examiner

| Composition %weight | SEM images at 300x |
|---|---|
| a<br>13.98% Ca<br>10.77% S<br>0.36% Na<br>0.35% Cl<br>27.8% O |  |
| b<br>5.54 % Ca<br>4.44% S<br>1.53 % Na<br>1.75% Cl<br>16.93% O |  |

| | Composition %weight | SEM images at 1000x |
|---|---|---|
| a | 43.2 % Ca<br>- % Na<br>0.87% Cl<br>39.3% O |  |
| b | 14.23 % Ca<br>0.47 % S<br>22.74 % Na<br>29.2% Cl<br>13.5% O |  |

| | | |
|---|---|---|
| c | 25.29 % Ca<br>0.45 % S<br>7.44 % Na<br>12.8% Cl<br>27.79% O |  |
| d | 36.85 % Ca<br>0.48 % S<br>1.91 % Na<br>1.87% Cl<br>40.69% O |  |
| Concentration (ppm) | Composition %weight | SEM images at 1000x |

-40,730,087.12 kcal/mol    -4,333,557.20 kcal/mol    -45,063,806.70 kcal/mol

■ Oxygen Atoms   ▢ Calcium Atoms
▢ Sulfur Atoms

US 10,584,048 B2

PROCESS TO OBTAIN RANDOM COPOLYMERS DERIVED FROM ITACONIC ACID AND/OR ITS ISOMERS AND SODIUM ALKENYL SULFONATES AND USE OF THE PRODUCT THEREOF

CROSS-REFERENCE TO RELATED APPLICATION

This application claims the benefit and priority to Mexican application No. MX/a/2013/004644 with a filing date of Apr. 25, 2013, the disclosure of which is incorporated herein by reference in its entirely.

FIELD OF THE INVENTION

The present invention relates to the process for obtaining random copolymers derived from itaconic acid and/or its isomers and sodium alkenyl sulfonates through polymerization via free radicals at an acidic pH and that uses a redox system as initiator. The invention is also directed to the uses of the random copolymers as calcium carbonate and calcium, strontium and barium sulfates mineral scale inhibitors and dispersants of calcium carbonate and strontium, barium and calcium sulfates, clays and iron oxides. The random copolymers prevent and control formation damage and obstruction to the hydrocarbon production rig, caused by mineral salts scale present in oil reservoirs due to high salinity levels of the formation water, incompatible mixtures of injection water and formation water, as well as pressure, temperature and pH changes.

Random copolymers are used to inhibit and disperse mineral scale present in cooling systems and boilers used in the oil and chemical industry and are characterized for being tolerant to high concentrations of divalent ions, such as calcium, magnesium, strontium and barium, and by the fact that for their application in the reservoir or production rig, treated water, sea water and/or water that is characteristic of the reservoir can be used as means of transportation. Furthermore, the copolymers of the present invention are characterized for being suitable for use under high temperature conditions and for their low toxicity.

BACKGROUND OF THE INVENTION

The formation of scales in low (matrix) and high (fractures) conductivity zones in oil reservoirs, as well as in oil well drilling systems, production systems, surface equipment, boilers and cooling systems is a major part of the problems found in oil operations.

Most of the scales found in oilfields build up either by precipitation of minerals present in the formation water, or as a result of the produced water oversaturation with mineral components when two incompatible water currents (injection water-formation water) converge at the bottom of the well or at the formation rock. Every time an oil well produces water or uses injection water as a recovery method, the possibility arises for mineral scale to build up.

Formation damage is defined as naturally occurring or induced partial or total obstruction occurring in the rock with the flow of the producing (oil and gas) formation fluids towards the well and vice versa. It is a problem that can happen at different stages of the hydrocarbon exploitation and recovery process, as a result of alterations of the most important petrophysical properties of the rock, such as effective porosity and absolute permeability. Formation damage can be naturally occurring or induced by the fluids used in different operations that are carried out in wells, such as drilling, cementation, completion, repair, production, stimulation treatment and water or gas injection.

Scales can develop in formation pores near the wellbore, which drastically reduces the porosity and permeability of the rock, and also can be present in the production and injection pipelines with the following consequences: damage to the oil reservoir formation, decrease in crude oil production, problems with water injection, flow restriction (pressure losses), well reconditioning works due to reduced production, corrosion in production and injection pipelines and surface equipment, among others. All these problems generate high-cost cleaning treatments, in addition to continuous replacement and maintenance of equipment and pipelines, if the loss of a productive well is not appropriately controlled. The factors that influence the formation of these depositions are: temperature, pressure, flow rate, salinity, concentration of solids dissolved in water, pH, among others.

Scales found in low (matrix) and high (fractures) conductivity zones of the reservoir vary on its composition, which mainly consists of calcium carbonate and calcium, strontium and barium sulfates, as well as iron oxides.

Some mineral scales, such as calcium carbonate ($CaCO_3$), can be dissolved with acids, but this depends heavily on the purity of the mineral, since calcium carbonate generally is combined with other minerals such as calcium sulfate and barium sulfate, which are highly stable in acid environments.

Oil reservoir brines contain particulate matter such as clays and precipitates, mainly calcium compounds. Particles can deposit and build up on surfaces, producing excessive sediments in regions with low velocity water and interfere with the flow of water through the effective porosity of reservoir formations.

For the particular case of the area of services, the formation of deposition in cooling systems is one of the most important problems for production operations throughout the industry. The most important problems caused by scale deposition are: reduced heat transfer, flow restriction (pressure losses), corrosion, among others, which generate costly cleaning expenses, as well as shutdowns and continuous equipment and pipelines maintenance.

In order to offset this kind of problems, a wide range of methods have been used worldwide, with chemical additives standing out for its efficiency and cost, including: scale inhibitors, inorganic salts dispersants and acid solvents, whether in combination or independently.

The most commonly used chemical products include:
1) Sequestering agents. These act through chelation of cations ($Ca^{2+}$, $Ba^{2+}$, $Sr^{2+}$) present in congenital water, so that their solubility products are not exceeded due to concentration. One if the products most widely used is ethylenediaminetetraacetic acid (EDTA).

The disadvantages of this type of products are:
a) Since they work in a stoichiometric manner, a large amount of chelation agent is required, which is undesirable from the economic point of view.
b) They are effective only at low concentrations of dissolved divalent ions.

2) Poly(phosphates). The most widely used are sodium hexametaphosphate ($NaPO_3)_6$, sodium tripolyphosphate ($Na_5P_3O_{10}$) and several oligo-phosphates, such as those indicated in the U.S. Pat. No. 2,358,222, wherein their structural formulas are the following: $Na_9P_7O_{22}$, $Na_4P_2O_7$, $Na_6P_4O_{13}$, $Na_5P_3O_{10}$. The inhibitors work in water with moderate calcium concentrations and at a pH close to neutral. The problem posed by poly(phosphates) is that the phosphorus-oxygen (P—O) bond is often reduced and forms orthophosphate ions ($PO_4^{-3}$) (J. Phys. Chem. A 1998, 102, 2838-2841), which may react with calcium ions ($Ca^{2+}$) to form calcium phosphates ($CaHPO_4$ and $Ca_3(PO_4)_2$). Reports in the literature (U.S. Pat. No. 4,673,508 "Inhibition of calcium phosphate scale formation with a maleate polymer", Patent No. EP0267597A2 "Calcium phosphonate inhibition", U.S. Pat. No. 4,929,632 "Calcium phosphate scale control methods") have indicated that this type of compounds generates obstruction problems in pipelines, corrosion and decreased heat transfer of equipment when high divalent ions concentrations, high temperature and abrupt pH changes are used (B. P. Boffardi, Materials Performance, 50, 1993).

3) Organophosphonates. These are compounds that contain the phosphorus-carbon bond (P—C) in their structure and work through inhibition mechanisms at the threshold of crystal precipitation and modification. Organophosphonates are widely used as calcium carbonate scale inhibitors; the most common include 1-hydroxyethylene 1,1, diphosphonic acid (a), amino tri-methylene phosphonic acid (b) and diethylenetriamine pentamethylene phosphonic acid (c) (1).

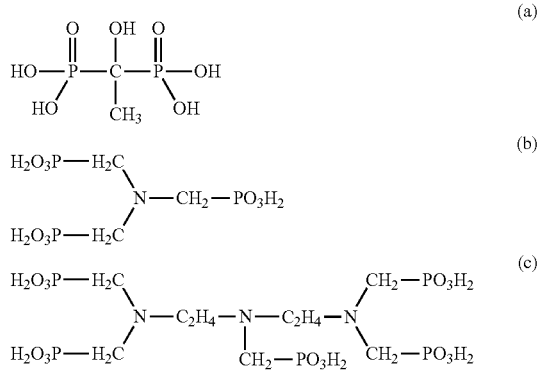

(1) Phosphonates employed as scale inhibitors a) 1-hydroxyethylene 1,1, diphosphonic acid, b) amino tri-methylene phosphonic acid, c) diethylenetriamine pentamethylene phosphonic acid.

Additionally, there are other organophosphonates with anti-scale applications as indicated in the following patent documents:

U.S. Pat. No. 3,974,090 discloses the synthesis and use of phosphonates having the following structural formula:

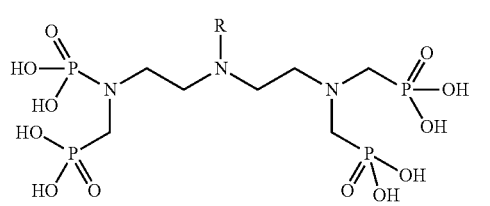

U.S. Pat. No. 3,886,205 describes and protects the synthesis and use of a scale inhibitor compound such as the following:

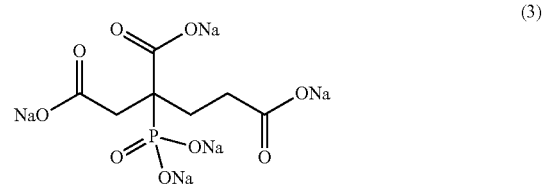

This type of inhibitor presents the advantage that the phosphorus-carbon bond is less susceptible to hydrolysis, but in more severe operating conditions, such as pH sudden changes, high concentration of calcium ions and temperatures above 150° C., they are susceptible to react with calcium ions to form calcium phosphates (G. E. Geiger, Water & Process Technology, 2006, 1-7, "New Non-Phosphorous Calcium Carbonate Inhibitor Reduces Phosphorus Levels and Overcomes Limitations of Phosphonates"; J. M. Brown, W. S. Carey, J. F. McDowell, Corrosion/93, Paper No. 463, 1993; "Development of an Environmentally Acceptable Cooling Water Treatment Program: Non-Phosphorus Scale Inhibitor"; W. Wang, A. T. Kan, M. B. Tomson, SPE 155108, 2012, 1-16; "A Novel and Comprehensive Study and Polymeric and Traditional Phosphonate inhibitors for High Temperature Scale Control"; F. H. Browning, H. S. Fogler, Langmuir 1995, 11, 4143-52; "Effect of synthesis parameters on the properties of calcium phosphonate precipitates"). In addition to this, organophosphonates are susceptible to degradation by oxidizing biocides (Separation Science and Technology, 42, 2007, 1639-1649; "Degradation of Phosphonate-Based Scale Inhibitor Additives in the Presence of Oxidizing Biocides: "Collateral Damages" in Industrial Water Systems") and to form orthophosphate ions, which react with calcium ions present in water to form calcium phosphates and, therefore, to generate obstruction problems in pipelines and decreased heat transfer in cooling systems.

4) Polymers. Generally, polymeric anti-scaling agents inhibit the formation of scale by chemisorption on the microcrystals active-site facets, and by means of phenomena such as crystal modification, dispersion and inhibition at the precipitation threshold, they prevent the microcrystal growth and clustering.

Some of the most widely used polymers (4) are sodium poly(acrylate), poly(maleic acid), sodium polyvinyl sulfonate and acrylic acid-sodium vinyl sulfonate-derived copolymers.

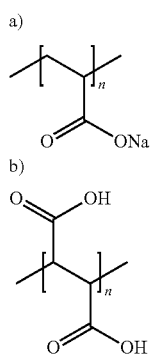

c)

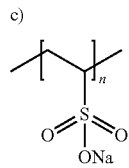

d)

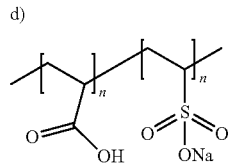

(4). Polymers employed as scale inhibitors: a) sodium poly (acrylate), b) poly(maleic) acid, c) sodium polyvinyl sulfonate and d) acrylic acid-sodium vinyl sulfonate-derived copolymer.

Furthermore, and in order to create enhanced systems, compounds containing several anti-scaling agents have been developed, wherein the following stand out:

European patent No. EP 0256057B1 ("Scale inhibitor"). It describes the use of products to prevent calcium and magnesium scale to build up in evaporation systems, boilers and water-purifying equipment. The patent focuses on the synergistic effect that is generated when three inhibitors are combined. Assessments were performed using different combinations of scale inhibitors in order to find the most effective formulation for the control of $CaSO_3$, $CaCO_3$ and $Mg(OH)_2$ scales. The most effective formulation consists of two polymers (polymaleic acid and sodium styrene sulfonate- and maleic acid-derived copolymer) and an amino phosphonic acid.

European patent application EP0976911A1 ("Scale inhibitors"). It describes a commercial scale-inhibitors combination applied in hydrocarbon extraction and production systems. The compounds contain commercial inhibitors, such as phosphonates, acrylic acid-based copolymers and terpolymers, phosphine acid-carboxylate and phosphate esters combined with amines, since this combination generates an advantage against conventional inhibitors, especially when diethylenetriamine-tetramethylene phosphate is used. This type of amine is characterized for remaining in the fluid at a wide range of temperatures, as well as for being soluble in hydrocarbons such as kerosene, diesel and heavy aromatic naphthas.

U.S. Pat. No. 4,331,792 ("Continuous process for production of copolymer of an alkali metal vinyl sulfonate and acrylic acid") describes the process for continuous production of the sodium vinyl sulfonate- and acrylic acid-based copolymer, wherein the monomers are mixed and the pH is adjusted at a range of 4-5.5. Additionally, the reaction medium is combined with ammonium persulfate and sodium bisulfite as free radicals-promoting catalyst agents. The reaction is performed in a tubular reactor adiabatically operated at temperatures of 140-220° F. and residence times from 5 to 7 minutes, while the resulting copolymer is removed by precipitation with methanol. The patent also states that the obtained copolymer is useful to prevent the formation of calcium and magnesium scale.

U.S. Pat. No. 4,710,303 ("Low molecular weight polyvinyl sulfonate for low pH barium sulfate scale control"), describes a method to inhibit scaling with sodium polyvinyl sulfonate and compares its effectiveness with regard to other compounds (phosphate esters, sodium hexametaphosphate, 1-hydroxyethylene 1,1, diphosphonic acid, diethylenetri- amine phosphonate, acrylic acid-maleic acid copolymer, poly-acrylic acid) in a synthetic brine containing $Ba^{2+}$ and $SO_4^{2-}$ ions. Based on this method, sodium polyvinyl sulfonate is effective in the inhibition of scale at pH=2.5-4 conditions and at a temperature of 70° C. at concentrations of 5-10 ppm.

U.S. Pat. No. 5,089,150 ("Method of increasing retention of scale inhibitors in subterranean formations") describes a method to cross-link acrylate-phosphates based polymers with hydroxide based polymers in order to produce more resistant and compatible compounds in high salinity environments that are characteristic of underground formations. According to said patent, the key point in the inhibitors: stability relies in the polymers cross-linking with polyalcohols, which occurs by esterification of the inhibitors carboxylates and the polyalcohol hydroxides, which results in an increase of the polymeric chains molecular weight, with the same occurring if the polymer is comprised by phosphate groups. As the testing method, they used Berea-type sandstone pre-saturated with congenital water at 90° C. and an injected solution with 2000 ppm of inhibitor dissolved in sea water for each 15 pore volumes.

U.S. Pat. No. 8,215,398 ("Polysaccharide based scale inhibitor"), proposes a method to modify polysaccharides, since derivatives of this type of compounds turn out to be effective in the inhibition of different types of scale. The modified polysaccharide has a molecular weight up to 500,000 AMU and has the features of being biodegradable and resistant to high temperatures as well. It turns out to be useful in the control of corrosion and scale in oil reservoirs due to its high tolerance to organic and inorganic salts such as sodium and potassium chlorides, as well as calcium and magnesium ions.

U.S. Patent Publication No. 2002/0150499A1 ("Oil-soluble scale inhibitors with formulation for improved environmental classification") provides information about the composition of scale inhibitors with application in hydrocarbon production systems. Formulations contain commercial inhibitors in their acid form, 2-ethyl-hexylamine (2-EHA) and similar amines. The described formulations show an advantage over conventional scale inhibitors, since they are less toxic and more biodegradable.

U.S. Patent Publication No. 2005/0282712A1 ("Scale control composition for high scaling environments") describes the effectiveness of phosphonate-, sodium sulfonate- and unsaturated dicarboxylate-based polymers, which are useful in the control of $BaSO_4$ and $CaCO_3$ scales in oil reservoir formations.

U.S. Patent Publication No. 2007/0267193A1 ("Stimulating oilfields using different scale-inhibitors") discloses a method to stimulate an oilfield, using scale inhibitors, with secondary recovery techniques. The method comprises injection of water steam and measurement of inhibitor fractions contained in the recovered fluids.

U.S. Patent Publication No. 2010/0163494A1 ("Preparation of environmentally acceptable scale inhibitors") presents a method for the control of scale by employing amino-acids to prepare alkyl-phosphonates, which are obtained by controlling the alkyl-phosphonation reaction. According to this proposal, when hydrogens (—H) from each amine-group are substituted with alkyl-phosphonate groups (—R—PO—$(OH)_2$), this type of compounds turn out to be highly effective in the inhibition of $CaCO_3$ and $BaSO_4$ scale. However, the resulting mono-alkylated amino-acids tend to be more biodegradable than the amino-acids di-substituted with alkyl-phosphonates.

U.S. Pat. No. 6,924,253B2 ("Scale removal") describes a method to remove scale (mainly BaSO$_4$ and CaCO$_3$) within or near the producing well in hydrocarbon recovery processes by using ionic liquids such as: 1-ethyl-3-methyl imidazole tetrachloroaluminate, 1-butylpyridine nitrate, 1-ethyl-3-methyl imidazole tetrafluoroborate and 1-butylpyridinium hexafluorophosphate.

U.S. Pat. No. 7,306,035 ("Process for treating a formation") proposes a method to increase oil fields production using chemical products in the form of gels wherein these, once inside the formation, encapsulate the oil and facilitate its extraction. On the other hand, this proposal takes into account aspects such as the importance of scale control; thereby it proposes using other substances as additives in the formulation of said gels.

Commonly, some of these chemical substances are scale inhibitors comprising carboxylic and sulfonic groups and combined with molecules composed of carboxylic acids, aminoacids, hydroxycarboxylic acids, hydroxyls, aminophosphates or sulfonates groups.

European patent EP 1639228B1 ("Method for stimulating an oilfield comprising using different scale-inhibitors") proposes the production of crude oil by injecting water steam in the producing zone as displacing fluid and to recover it as an oil-bearing fluid, with the intention of this proposal being to perform the fluid injections in different segments of the producing zone. It also contemplates the use of scale inhibitors at different concentrations and injected directly and/or diluted.

In general, this is a production method wherein the injection of the inhibitor in different zones allows for an improvement in scaling control.

By virtue of the demands in hydrocarbon production processes, as well as in the area of services, specifically cooling systems and boilers, this type of substance must be able to work under severe operation and low toxicity conditions.

Therefore, the development of enhanced scale inhibitors and dispersants is a goal that is continuously pursued worldwide, and it is the purpose of the present invention.

It is worth mentioning that supramolecular chemistry is the part of chemistry that takes care of the study of systems that involve molecule or ion aggregates that are bound through non-covalent interactions, such as electrostatic interactions, coordination bonds, hydrogen bonds, π-π interactions, dispersion interactions and solvophobic effects.

Supramolecular chemistry can be divided in two large areas: 1) Host-Guest Chemistry and 2) Self-assembly. The difference between these two large areas is a matter of size and form; where there is no significant difference in size and none of the species acts as host to the other, the non-covalent bonding between two or more species is termed self-assembly.

From an energetic point of view, supramolecular interactions are much weaker than covalent bondings, which are in the energetic range of 150 to 450 Kj/mol for simple bonds. The non-covalent interactions energetic range goes from 2 kj/mol for dispersion interactions to up to 300 kj/mol for ion-ion interactions (Table 1), and the sum of several supramolecular interactions can produce highly stable supramolecular complexes.

With regard to the formation of supramolecular complexes from the interaction of polymers or organic compounds with mineral salts with scaling properties, the following examples are found in literature:

The article "Binding of Calcium and Carbonate to Polyacrylates" (Journal of Physical Chemistry B 2009, 113, 7081-7085) proposes that the interaction of polyacrylates with calcium carbonate is a thermodynamically-favored process that results in the formation of complexes, which are characterized for preventing the growth of calcium carbonate crystals.

TABLE 1

| Supramolecular Interactions Strength | |
|---|---|
| Interaction | Strength (Kj/mol) |
| Ion-ion | 200-300 |
| Ion-dipole | 50-200 |
| Dipole-dipole | 5-50 |
| Hydrogen bond | 4-120 |
| Cation-π | 5-80 |
| π-π | 0-50 |
| Van der Walls | <5 |
| Hydrophobic | Related with the solvent-solvent interaction energy |

The article "Control of Crystal Nucleation and Growth of Calcium Carbonate by Synthetic Substrates" (*Chemistry of Materials* 2001, 13, 3245-3259) indicates that calcium carbonate crystals nucleation and growth can be controlled by using synthetic substrates and that this process involves the formation of supramolecular complexes resulting from the adsorption process of monomers or carboxylated polymers on calcium carbonate surfaces.

The article "A new Design Strategy for Molecular Recognition in heterogeneous Systems: A Universal Crystal-Face Growth Inhibitors for Barium Sulfate", Peter V. et al. (J. Am. Chem. Soc. 2000, 122, 11557-11558), indicates that the strategy for the design of new additives that control scaling problems is based on molecular recognition and that polyaminomethylphosphonates derived macrocycles control the growth of barium sulfate crystals through the formation of complexes.

The article "At the Interface of Organic and Inorganic Chemistry: Bioinspired Synthesis of Composite Materials" (*Chemistry of Materials* 2001, 13, 3227-3235) indicates that the design of biomineralization processes artificial models has led to the combination of inorganic materials investigation and organic supramolecular chemistry, and that polyamides ligands with carboxylates interact with calcite crystals. Furthermore, the article mentions that copolymers in block with two hydrophilic groups have been successfully used to modulate the morphology of inorganic materials such as calcium carbonate and barium sulfate.

Computational chemistry is a widely used tool worldwide to predict the stability and structure of chemical systems with enhanced potential properties and has found application at industrial level in the development of quantitative structure-activity relationship studies. Computational calculation methods that have been used for this purpose include molecular mechanics methods, quantum methods, which comprise semi-empiric and ab-initio methods, and the density functional theory methods. As examples in literature demonstrating the use of computational chemistry to accurately predict supramolecular interactions in chemical systems and/or thermodynamic and kinetic aspects of chemical processes, the following articles can be quoted: 1) Cornucopian Cylindrical Aggregate Morphologies from Self-Assembly of Amphiphilic Triblock Copolymer in Selective Media (Journal of Physical Chemistry B, 2005, 109, 21549-21555), 2) Density Functional Calculations, Synthesis, and Characterization of Two Novel Quadruple Hydrogen-Bonded Supramolecular Complexes (Journal of Physical Chemistry A, 2004, 108, 5258-5267), 3) Strong Decrease of the Benzene-Ammonium Ion Interaction upon Complexation with a Carboxylate Anion (Journal of American Chemical Society, 1999, 121, 2303-2306).

It is important to highlight that none of the abovementioned references deals with obtaining random copolymers based on itaconic acid or isomers and sodium alkenyl sulfonates and the use thereof to inhibit scale of minerals such as calcium carbonate and barium, strontium and calcium sulfates that occur due to water incompatibility (injection water-formation water) in an oil reservoir, as well as in the production rig of an oil well, and as dispersants of clays, calcium carbonate, barium, strontium and calcium sulfates and iron oxides present in oil facilities. Additionally, there is also no mention about their use in cooling systems and boilers present in the oil and chemistry industry.

BRIEF DESCRIPTION OF THE DRAWINGS

In order to have a better understanding regarding the application of the copolymers of the present invention as mineral scale inhibitors and dispersants, the reference drawings are described below.

DETAILED DESCRIPTION OF THE INVENTION

Figure 1:
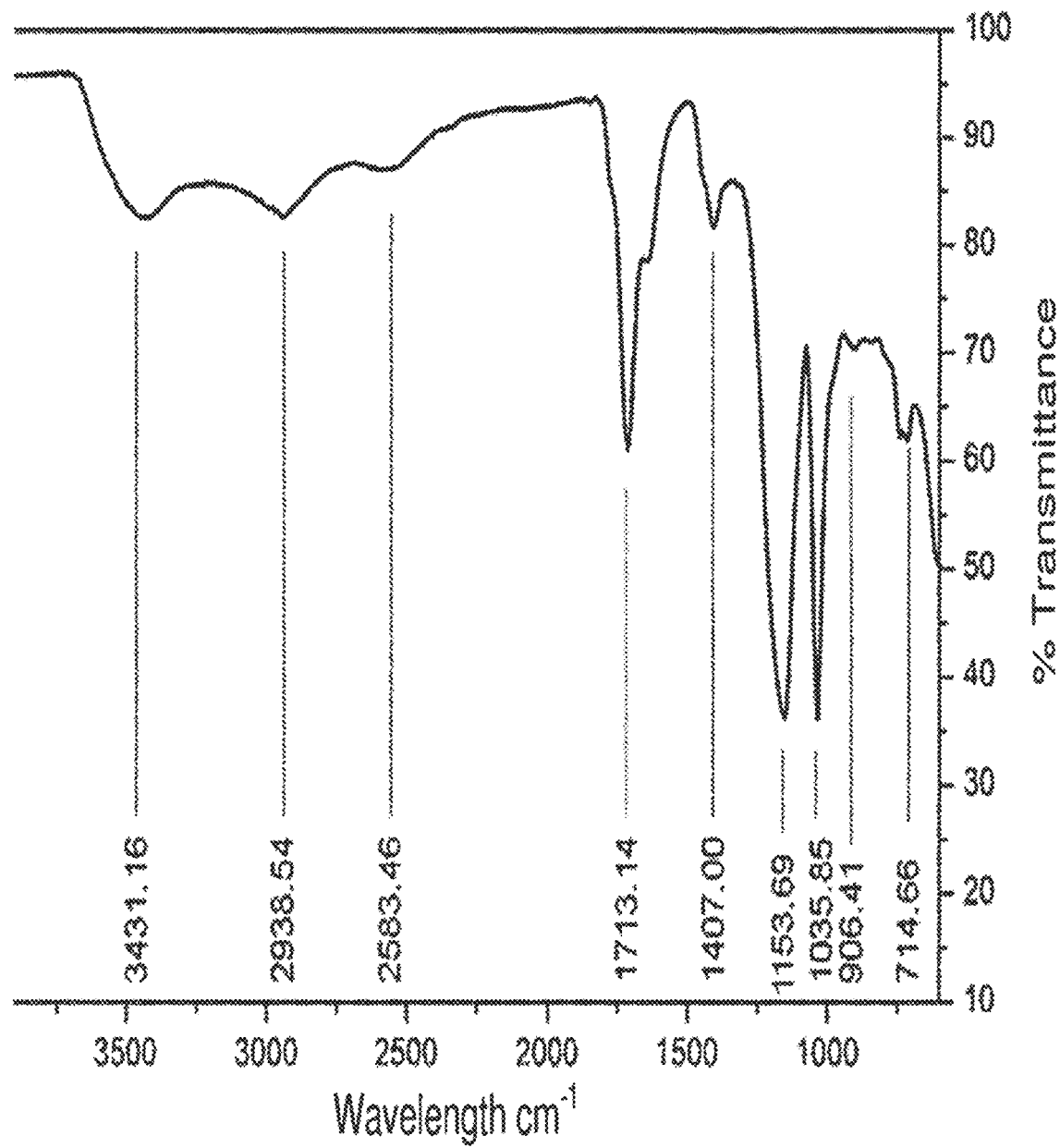
FIG. 1 shows product 1 infrared spectrum.

The present invention relates to the process for obtaining random copolymers based on itaconic acid or its isomers and sodium alkenyl sulfonates having the structural formula (5), through polymerization in an aqueous solution via free radicals at an acidic pH within the range from 1.0 to 3.5 and a redox system as initiator, and the use thereof as scale inhibitors of minerals such as calcium carbonate and calcium, strontium and barium sulfates and dispersants of clays, iron oxides, calcium carbonate and calcium, strontium and barium sulfates. Copolymers prevent and control formation damage and obstruction of the hydrocarbon production rig caused by scales of mineral salts present in oil reservoirs due to high levels of salinity of the formation water, incompatible mixtures of injection water and formation water, as well as pressure, temperature and pH changes. Copolymers are used to inhibit and disperse mineral scales present in cooling systems and boilers used in oil and chemical industry and are characterized for being tolerant to high concentrations of divalent ions, such as calcium, magnesium, strontium and barium and for the fact that for its application at the reservoir or production rig, treated water, sea water and/or water that is characteristic of the reservoir is used as means of transportation. Furthermore, the random copolymers of the present invention have the features of being suitable for use under high temperature and high salinity conditions and of possessing low toxicity.

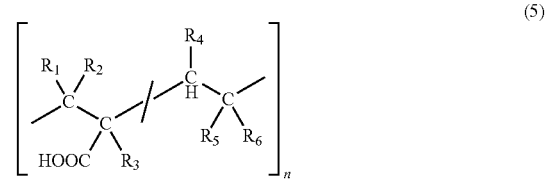

(5)

Where: $R_1$=—H, —CH$_3$, $R_2$=—H, —CH$_2$COOH, COOH, $R_3$=—CH$_2$COOH, H, $R_4$=—H, $R_5$=—H, —CH$_3$, $R_6$=—SO$_3$Na, —CH$_2$SO$_3$Na, —CONHC(CH$_3$)$_2$CH$_2$SO$_3$Na, C$_6$H$_4$SO$_3$Na, where n ranges between 2 and 75.

One feature of the invention is to provide a process for producing the random copolymer of Formula 5 from itaconic acid and/or isomers and sodium sulfonates. The process is by polymerization in an aqueous solution via free radicals at an acidic pH. The process comprises the steps of a) complete dilution of monomers in an aqueous medium, b) the addition of an iron salt as a free radical formation promoter, c) addition of an initiator at low volume flow and controlling the temperature, and d) agitation of the system at constant temperature and atmospheric temperature. In one embodiment, the initiator is a redox system. The redox system can be an initiator selected from the group consisting of hydrogen peroxide, sodium persulfate, potassium persulfate and ammonium persulfate. The iron salts can be ferrous ammonium sulfate or ferric ammonium sulfate.

In one embodiment, the process of producing the random copolymers first forms a mixture of itaconic acid and/or isomers thereof and a sodium alkenyl sulfonate at room temperature followed by heating under atmospheric pressure. An iron salt, such as ammonium ferric sulfate is added followed by stirring. An initiator, such as a hydrogen peroxide solution is added to the resulting mixture followed by stirring at a constant temperature to obtain the random copolymer.

The present invention relates to the process for obtaining random copolymers based on itaconic acid and/or isomers and sodium alkenyl sulfonates, by means of polymerization in aqueous solution via free radicals at an acidic pH in the range from 1.0 to 3.5 and with a redox system as initiator, and the use thereof as calcium carbonate and calcium, strontium and barium sulfates mineral scale inhibitors and as dispersants of clays, iron oxides, calcium carbonate and strontium, barium and calcium sulfates. Random copolymers prevent and control damage to the formation by mineral salts scale that occurs in an oil reservoir, obstruction of water injection and crude oil production pipelines, as well as in production rigs due to mineral scale precipitation, all this as a consequence of high levels of salinity of the formation water and incompatible mixtures of injection water and formation water. Random copolymers are characterized for being tolerant to high concentrations of divalent ions, such as calcium, magnesium, strontium and barium, and by the fact that for its application to the reservoir and to injection or production pipelines, treated water, sea water and water that is characteristic of the reservoir (formation water) can be used as means of transportation. On the other hand, the copolymers can also be used to inhibit and disperse mineral scale occurring in cooling systems and boilers used in the oil and chemistry industry.

Furthermore, the random copolymers of the present invention are characterized for meeting internationally established environmental standards and are classified as particularly non-toxic and therefore they can be used in pipelines and equipment from oil and chemical industry that uses fresh water and sea water that are characteristic of offshore and inland facilities.

In one embodiment, the redox system is hydrogen peroxide and ferric ammonium sulfate. The initiator can be included in an amount of 1 to 50% by weight based on the weight of the monomers. In one embodiment, the iron salt is present in an amount of 0.01 to 1% by weight based on the weight of the monomers. The process can be carried out at a temperature of 50 to 100° C. for a time of about 4 to 12 hours.

The itaconic acid isomers can be selected from the group consisting of cis-glutaconic acid, trans-glutaconic [MLT1] acid, citraconic acid and mesaconic acid. The sodium alkenyl sulfonate can be selected from the group consisting of vinyl sulfonic acid, allyl sulfonic acid, styrene sulfonic acid, 2-acrylamido-2-methyl-1-propanesulfonic acid and sodium and potassium salts thereof. The random copolymer of the invention can have a number average molecular weight of 500 to 20,000 AMU (g/mol). The stoichiometric ratio of the itaconic acid and/or isomers thereof with respect to the sodium alkenyl sulfonates range from 1:9 to 9:1.

The invention is also directed to a method of inhibiting and dispersing calcium carbonate and calcium, barium and strontium sulfate mineral scales and dispersing clays, calcium carbonate, calcium, barium and strontium sulfates and iron oxides that are present in high-temperature, high pressure and ultra-high salinity oil reservoirs by adding the copolymer of Formula 5 to the oil reservoir. The copolymers can be added in a brine which is supplied to or formed in the oil reservoir. The copolymers can also be used in a method of inhibiting and dispersing carbonate and calcium sulfate mineral scale present in boilers and cooling systems. The temperature of the reservoir, boiler or cooling system can be up to about 220° C. and a pressure of up to 8000 psi. The copolymer can be added to a brine in amounts of 1 to 10,000 ppm to disperse or inhibit mineral scale. The copolymer can be added to a brine having a salt content, such as a sodium chloride content of up to 450,000 ppm. The brine can have a hardness based on calcium carbonate of up to 250,000 ppm. The method can meet the Mexican NRF-005-PEMEX-2009 standard and is used in equipment and pipelines from oil and chemical industry that uses fresh water and is built on land. The use of the copolymer, also meets the Mexican NRF-005-PEMEX-2009 standard and that is used in equipment and pipelines from oil and chemical industry that uses sea water or formation water from oil reservoirs and that is built offshore.

For the development of the present invention, a procedure was followed, comprising the following stages: 1) Molecular design by means of computational chemistry, 2) Random copolymers synthesis and characterization and 3) Experimental assessment of the anti-scale and dispersant properties.

The selection of the present methodology is based on the fact that the key point for the development of anti-scale agents able to tolerate high salinity and divalent ions concentrations, as well as high temperature and pressure conditions, is the molecular-level understanding of how random copolymers based on itaconic acid or its isomers and sodium alkenyl sulfonates adsorb onto mineral salts crystals with scaling properties and give rise to supramolecular complexes able to: 1) Inhibit the precipitation threshold just after a nucleation center has formed. The copolymer will adsorb onto one of the inorganic salt's nucleation center microcrystallites faces and will form ionic pairs, thus hindering the diffusion of the ions to growth centers; 2) Distort or modify the crystal network. Adsorption of the copolymer onto an inorganic salt crystal will produce alterations in superficial properties, such as: size, adherence, hardness, resilience, crystalline structure, etc.; thus resulting in the crystals to fragment, to become amorphous, soft and poorly adherent and, therefore, this facilitates their removal by the continuous water flow, and 3) Disperse. The copolymers based on sulfonate and dicarboxylic acids functional groups will adsorb onto the growing crystals active sites and, through the non-adsorbed polymeric chains, steric and electrostatic repulsion effects are generated, which will increase the inorganic particles colloidal stability to keep them dispersed and prevent their clustering, thereby facilitating their removal by the continuous water flow.

1) Molecular Design by Means of Computational Chemistry.

Before going into details, and for clarification purposes, it is worth mentioning that the custom nowadays, prior to the development of new chemical products with enhanced properties, is to design, by means of theoretical calculations, the molecule intended to solve a certain problem, which were done according to the following explanation:

a) Compound A chemical structure, shown in (6), was used to represent a random copolymer based on itaconic acid and sodium vinyl sulfonate having a molecular weight of 1220 AMU and polydispersity index of 1.

b) Surface B chemical structure, shown in (7), was used to represent Calcium Carbonate crystals in their Calcite polymorphic form.

c) The geometries of compound A and surface B chemical structure were minimized in a water-solvated medium (dielectric constant 78.54) through quantum methods that use the Density Functional Theory and the LDA-VW Functional.

d) By means of computational chemistry, and using a water-solvated medium (dielectric constant 78.54) with quantum methods that use the Density Functional Theory and the LDA-VW Functional, compound A and surface B were put to interact, obtaining as a result supramolecular complex C (8), and the energetic results are shown in Table 2.

Figure 13:
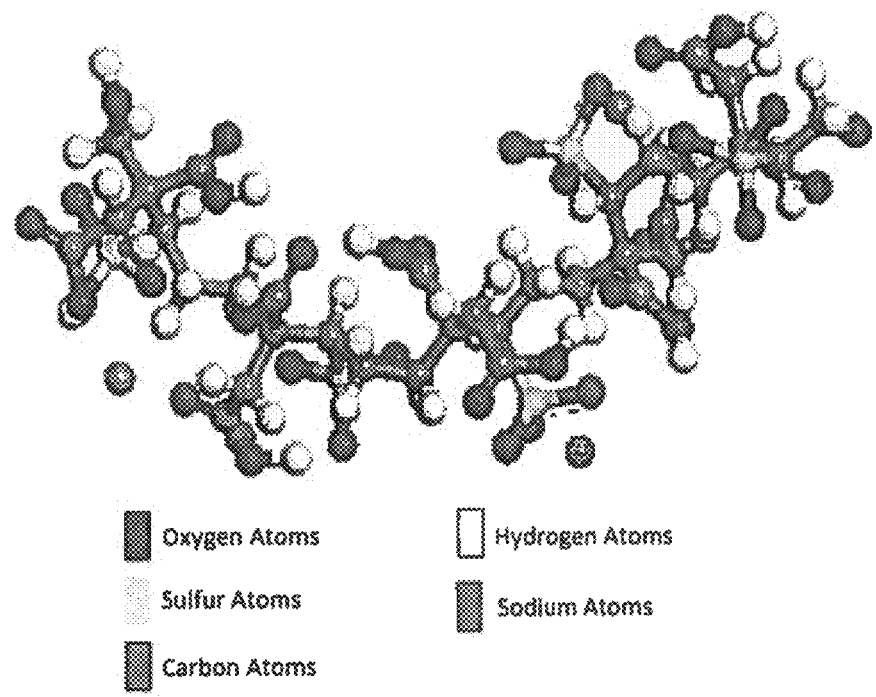
FIG. 13 shows the chemical structure of compound A of the random copolymer from itaconic acid and sodium vinyl sulfonate.

(6) Chemical structure A as shown in FIG. 13, represents a random copolymer based on itaconic acid and sodium vinyl sulfonate with molecular weight of 1220 AMU and polydispersity index of 1.

Figure 14:
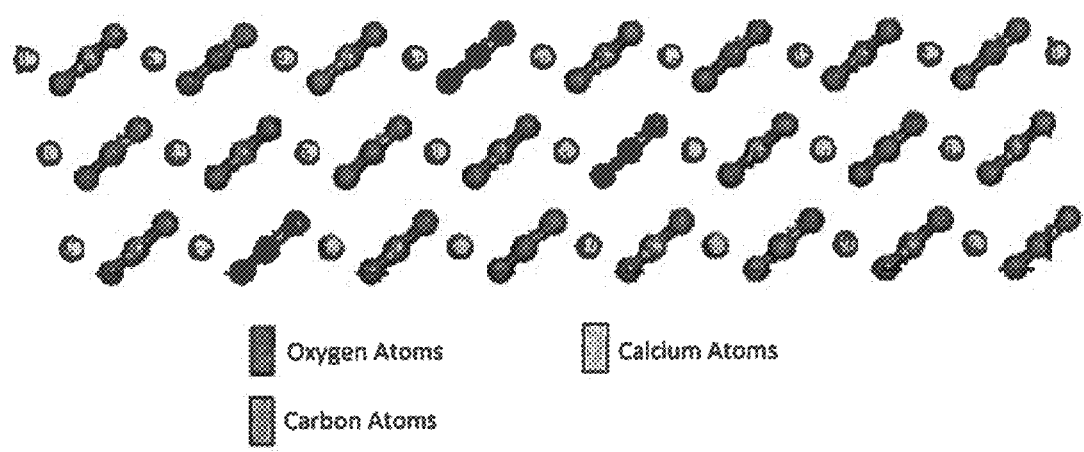
FIG. 14 illustrates the chemical structure of compound B of calcium carbonate crystals in calcite polymorphic form.

(7) Surface B chemical structure shown in FIG. 14, represents Calcium Carbonate crystals in their Calcite polymorphic form.

Figure 15:
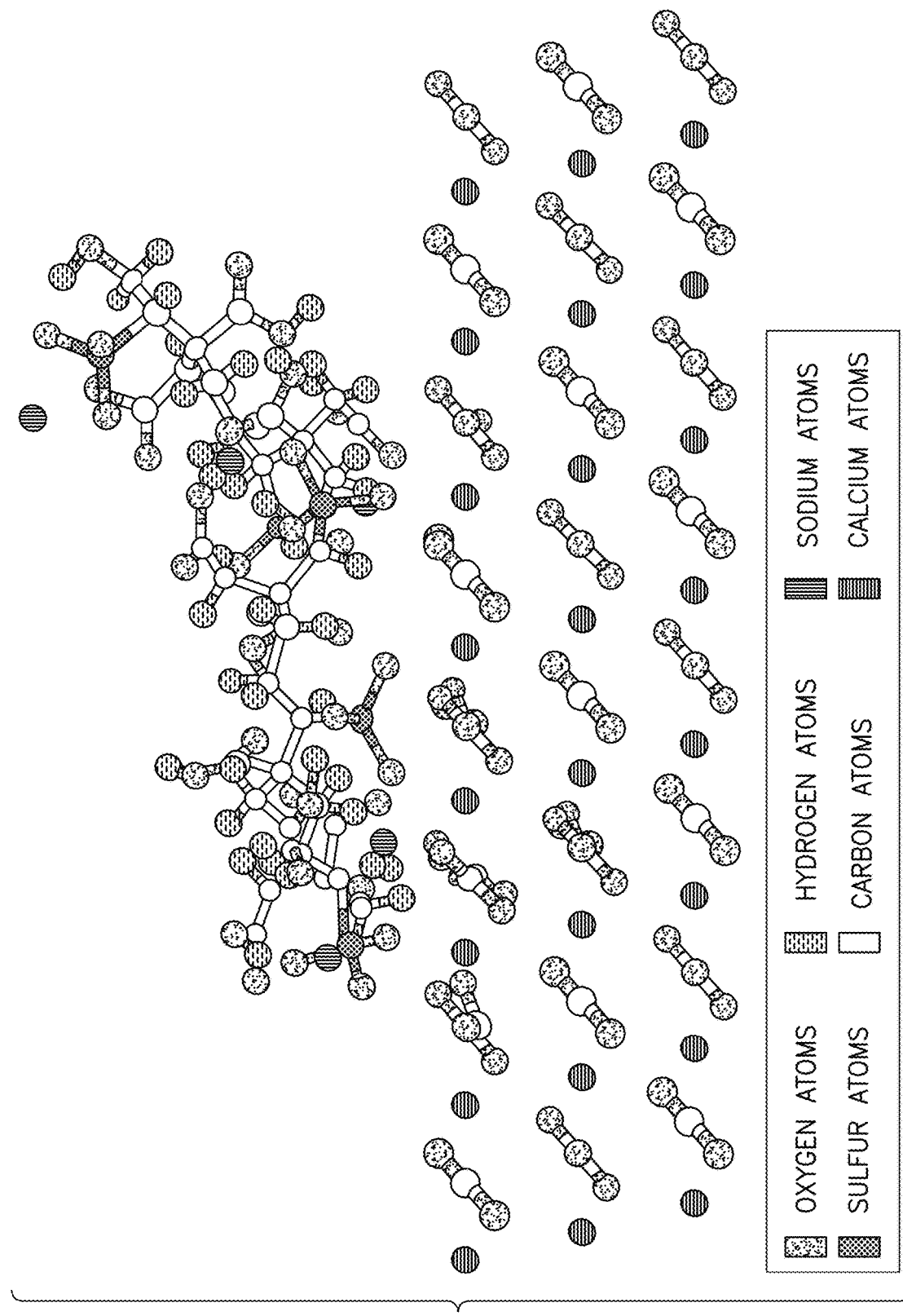
FIG. 15 shows the supramolecular complex C.

(8) Supramolecular complex C shown in FIG. 15 is obtained using computational chemistry and after the compound A-surface B interaction process.

The analysis of Table 2 results shows that the formation of supramolecular complex C from compound A and surface B molecular interaction (9) would be strongly favored from the thermodynamic point of view. Furthermore, the interaction energy of −175.49 Kcal/mol (−734.60 kj/mol) indicates that ion-ion-type supramolecular interactions would be present, as well as a combination of ion-dipole and hydrogen bonds interactions.

TABLE 2

Energy of compound A, surface B and supramolecular complex C, obtained by quantum methods that use the Density Functional Theory and the LDA-VW Functional.

| Compound or Complex | Density Functional Theory, LDA-VW Functional | |
| --- | --- | --- |
|  | Total energy (Kcal/mol) | Interaction Energy (Kcal/mol) |
| A | −4,333,557.20 |  |
| B | −70,629,908.32 |  |
| C | −74,963,641.02 | −175.49 |

Figure 16:
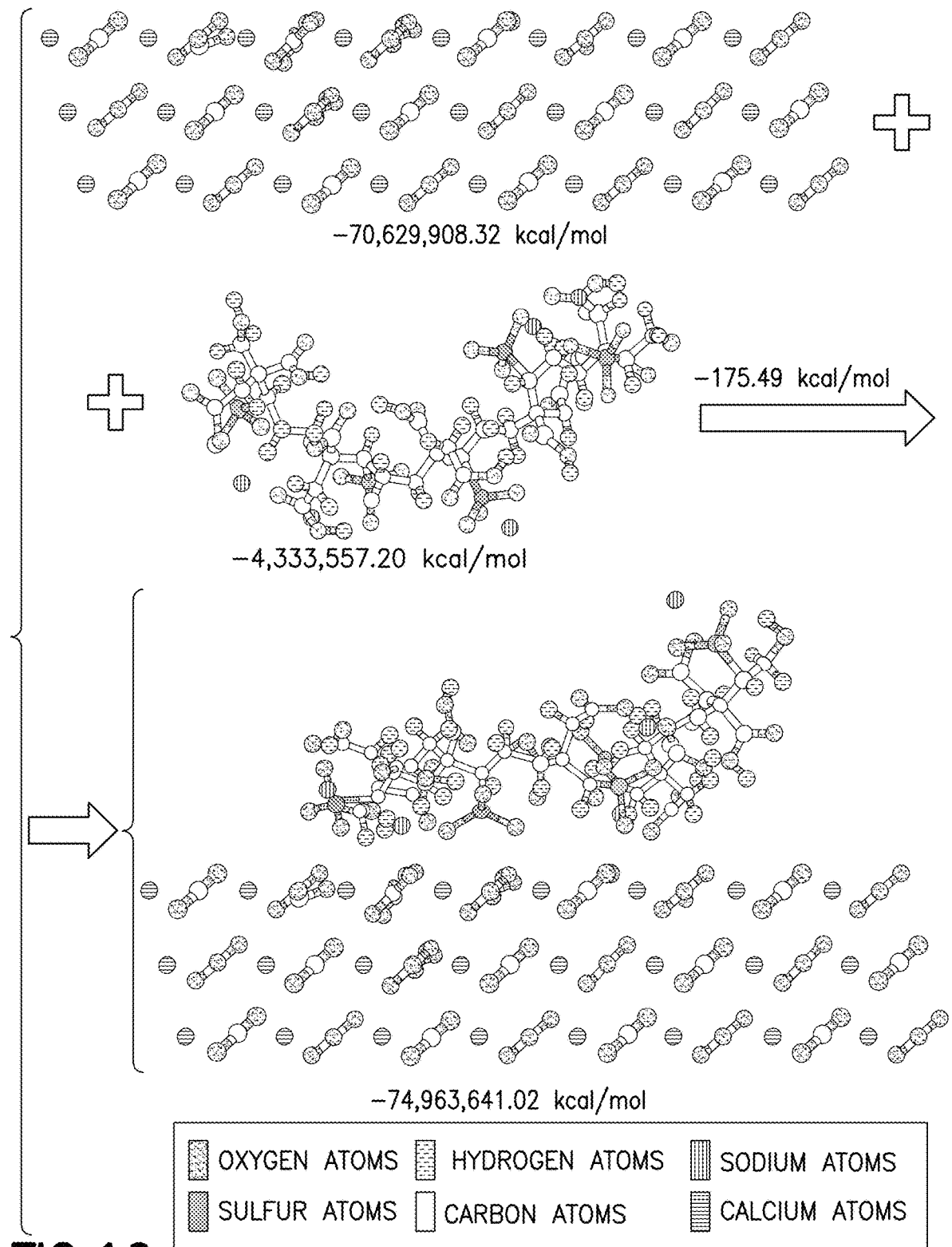
FIG. 16 illustrates the reaction of compound A with compound B to obtain the supramolecular complex C.

Where:
A = Random copolymer based on itaconic acid and sodium vinyl sulfonate with molecular weight of 1220 AMU and polydispersity index of 1.
B = Calcium Carbonate surface in its Calcite polymorphic form.
C = Supramolecular complex resulting from the interaction of the random copolymer based on itaconic acid and sodium vinyl sulfonate with molecular weight of 1220 AMU and polydispersity index of 1, which corresponds to compound A (6), and the Calcium Carbonate surface in its Calcite polymorphic form B (7) as shown in the reaction scheme of FIG. 16.

(9) Supramolecular complex C formation from compound A and surface B molecular interaction.

Determination of Interaction Between the Random Copolymer Based on Itaconic Acid and Sodium Vinyl Sulfonate with Barium Sulfate.

In order to establish the capability that random copolymers based on itaconic acid and sodium vinyl sulfonate would have to form supramolecular complexes with barium sulfate crystals and control their growth, by means of computational chemistry and using a water-solvated medium (dielectric constant 78.54) with quantum methods that use the Density Functional Theory and the LDA-VW Functional, a simulation was performed of the interaction process of a random copolymer based on itaconic acid and sodium vinyl sulfonate with molecular weight of 1220 and polydispersity index of 1, which corresponds to compound A chemical structure (6) with surface D shown in (10) and which represents Barium Sulfate crystals in their Barite polymorphic form, obtaining as a result supramolecular complex E (11), with the energetic results shown in Table 3.

Figure 17:
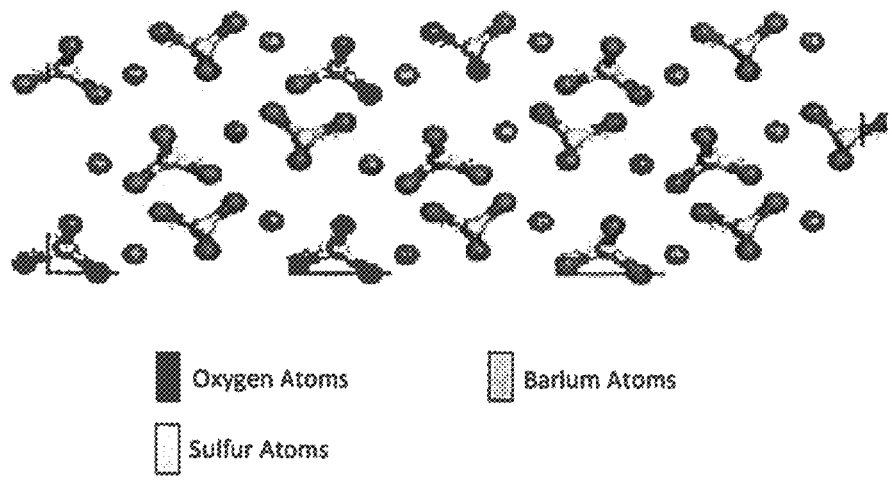
FIG. 17 illustrates the barium sulfate crystals.

(10) Surface D chemical structure represents Barium Sulfate crystals in their polymorphic form Barite shown in FIG. 17.

The analysis of Table 3 results shows that supramolecular complex E formation from compound A and surface D (12) interaction would be strongly favored from the thermodynamic point of view. Additionally, the interaction energy of −162.38 Kcal/mol (−679.73 kJ/mol) indicates that ion-ion-type supramolecular interactions would be present, as well as a combination of ion-dipole and hydrogen bonds interactions.

TABLE 3

Energy of compound A, surface D and supramolecular E obtained by means of quantum methods that use the Density Functional Theory and the LDA-VW Functional.

Figure 18:
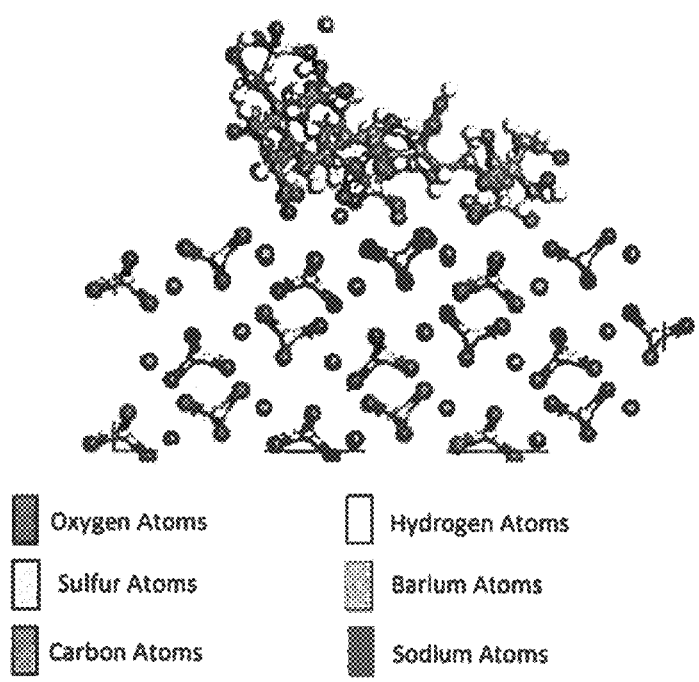
FIG. 18 illustrates the random copolymer (A) and barium sulfate in its barite polymorphic form.

| Compound or Complex | Density Functional Theory, LDA-VW Functional | |
| --- | --- | --- |
|  | Total energy (Kcal/mol) | Interaction Energy (Kcal/mol) |
| A | −4,333,557.20 |  |
| D | −40,730,087.12 |  |
| E | −45,063,806.70 | −162.38 | where:
A = Random copolymer based on itaconic acid and sodium vinyl sulfonate with molecular weight of 1220 AMU and polydispersity index of 1.
D = Barium Sulfate surface in its Barite polymorphic form.
E = Supramolecular complex derived from the interaction of the random copolymer based on itaconic acid and sodium vinyl sulfonate with molecular weight of 1220 AMU and polydispersity index of 1, which corresponds to compound A (6), and the Barium Sulfate surface in its Barite polymorphic form D (7) shown in FIG. 18.

(11) Supramolecular complex E is obtained through computational chemistry and after compound A with surface D interaction process.

Determination of Interaction Between the Random Copolymer Based on Itaconic Acid and Sodium Vinyl Sulfonate with Calcium Sulfate.

Figure 19:
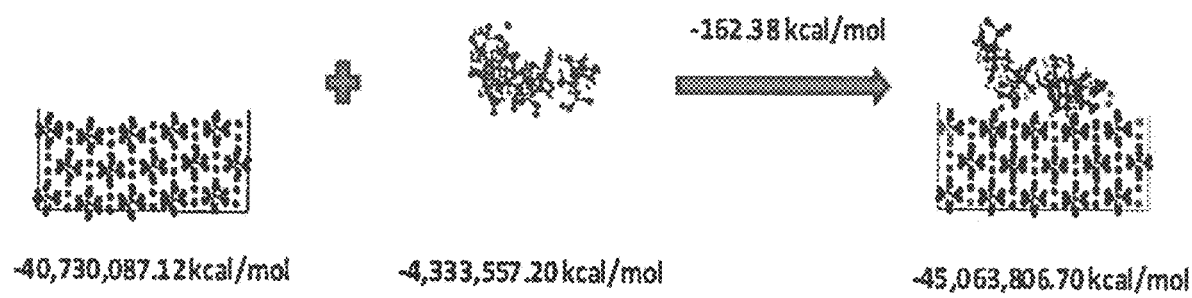
FIG. 19 illustrates the formation of supramolecular complex from compound A and calcium sulfate crystals.

In order to establish the capability that random copolymers based on itaconic acid and sodium vinyl sulfonate would have to form supramolecular complexes with calcium sulfate crystals and control their growth, by means of computational chemistry and using a water-solvated medium (dielectric constant 78.54) with quantum methods that use the Density Functional Theory and the LDA-VW Functional, a simulation was performed of the interaction process of a random copolymer based on itaconic acid and sodium vinyl sulfonate, with molecular weight of 1220 and polydispersity index of 1, which corresponds to compound A (6) chemical structure with surface F shown in (13) and which represents Calcium Sulfate crystals in their polymorphic form Anhydrite, obtaining as a result supramolecular complex G (14) shown in FIG. 19, with the energetic results shown in Table 4.

(12) Supramolecular complex E formation from compound A and surface D molecular interaction.

The analysis of Table 4 results shows that supramolecular complex G formation from compound A and surface F (15) interaction would be strongly favored from the thermodynamic point of view. Furthermore, the interaction energy of −130.99 Kcal/mol (−548.32 kJ/mol) indicates that ion-ion-type supramolecular interactions would be present, as well as a combination of ion-dipole and hydrogen bonds interactions as shown in FIG. 20.

Figure 20:
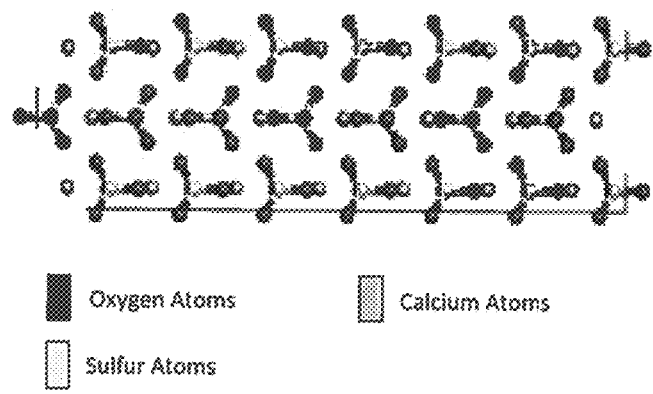
FIG. 20 shows the chemical structure of calcium sulfate.

(13) Surface F chemical structure represents Calcium Sulfate crystals in their polymorphic form Anhydrite shown in FIG. 20.

Figure 21:
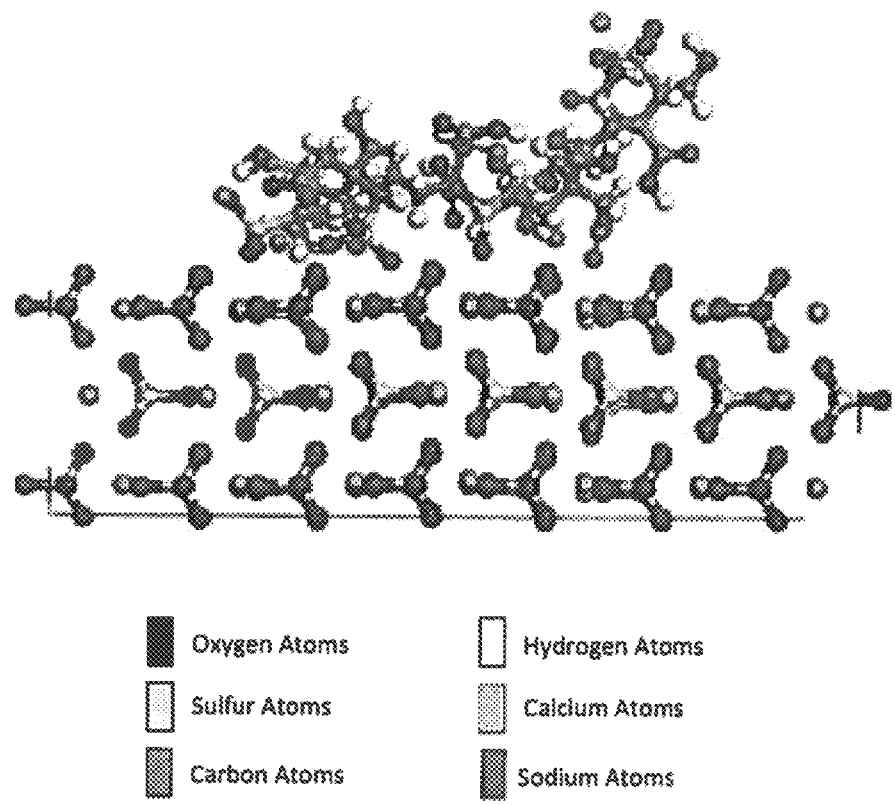
FIG. 21 shows the supramolecular complex G obtained from the chemical structure F of calcium sulfate crystals in the polymorphic anhydrite form and copolymer A.

(11) Supramolecular complex G shown in FIG. 21 is obtained using computational chemistry and after compound A with surface F interaction process.

The analysis of Tables 2 to 4 results indicates that the random copolymers based on itaconic acid or its isomers and sodium vinyl sulfonate (6) object of the present invention would have the capacity to form supramolecular complexes with Calcium Carbonate crystals in their polymorphic form calcite, Barium Sulfate crystals in their polymorphic form Barite and Calcium Sulfate crystals in their polymorphic form Anhydrite, as well as to control their growth and modify their morphology.

TABLE 4

Energy of compound A, surface D and supramolecular complex E obtained by means of quantum methods that use the Density Functional Theory and the LDA-VW Functional.

| Compound or Complex | Density Functional Theory, LDA-VW Functional | |
|---|---|---|
| | Total energy (Kcal/mol) | Interaction Energy (Kcal/mol) |
| A | −4,333,557.20 | |
| F | −108,444,369.12 | |
| G | −112,778,057.28 | −130.99 |

Figure 22:
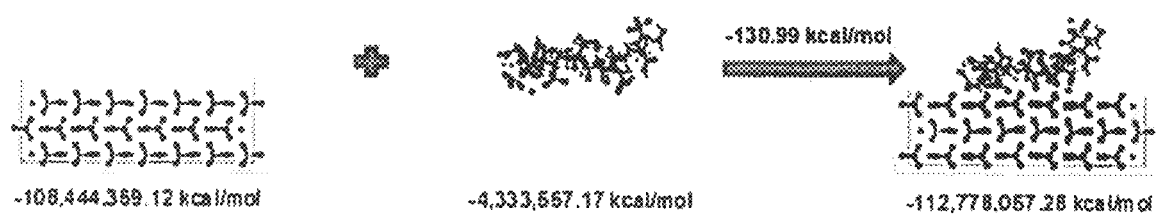
FIG. 22 shows the formation of supramolecular complex E from compound A and calcium sulfite D.

Where:
A = Random copolymer based on itaconic acid and sodium vinyl sulfonate with molecular weight of 1220 AMU and polydispersity index of 1.
F = Calcium Sulfate surface in its polymorphic form Anhydrite.
E = Supramolecular complex resulting from the interaction of the random copolymer based on itaconic acid and sodium vinyl sulfonate with molecular weight of 1220 AMU and polydispersity index of 1, which corresponds to compound A (6) and Calcium Sulfate surface D (14) in its polymorphic form Anhydrite as shown in FIG. 22.

(15) Supramolecular complex G formation from compound A and surface F molecular interaction.

2) Random Copolymers Synthesis and Spectroscopic Characterization.

The random copolymers based on itaconic acid or its isomers and sodium vinyl sulfonate having the structural formula (5) of the present invention are obtained by means of a polymerization process in aqueous solution via free radicals and a redox system as initiator. Polymerization is carried out at an acid pH in the range of 1.0 to 3.5, under atmospheric pressure and at temperatures ranging from 50 to 100° C. The copolymers obtained are characterized for having a low polydispersity index ranging from 1 to 1.4 and low average molecular weights under 20,000 AMU.

The following examples will serve to illustrate the synthesis of the random copolymers based on itaconic acid or isomers and sodium vinyl sulfonate object of the present invention.

Example 1 (Product 1)

Figure 2:
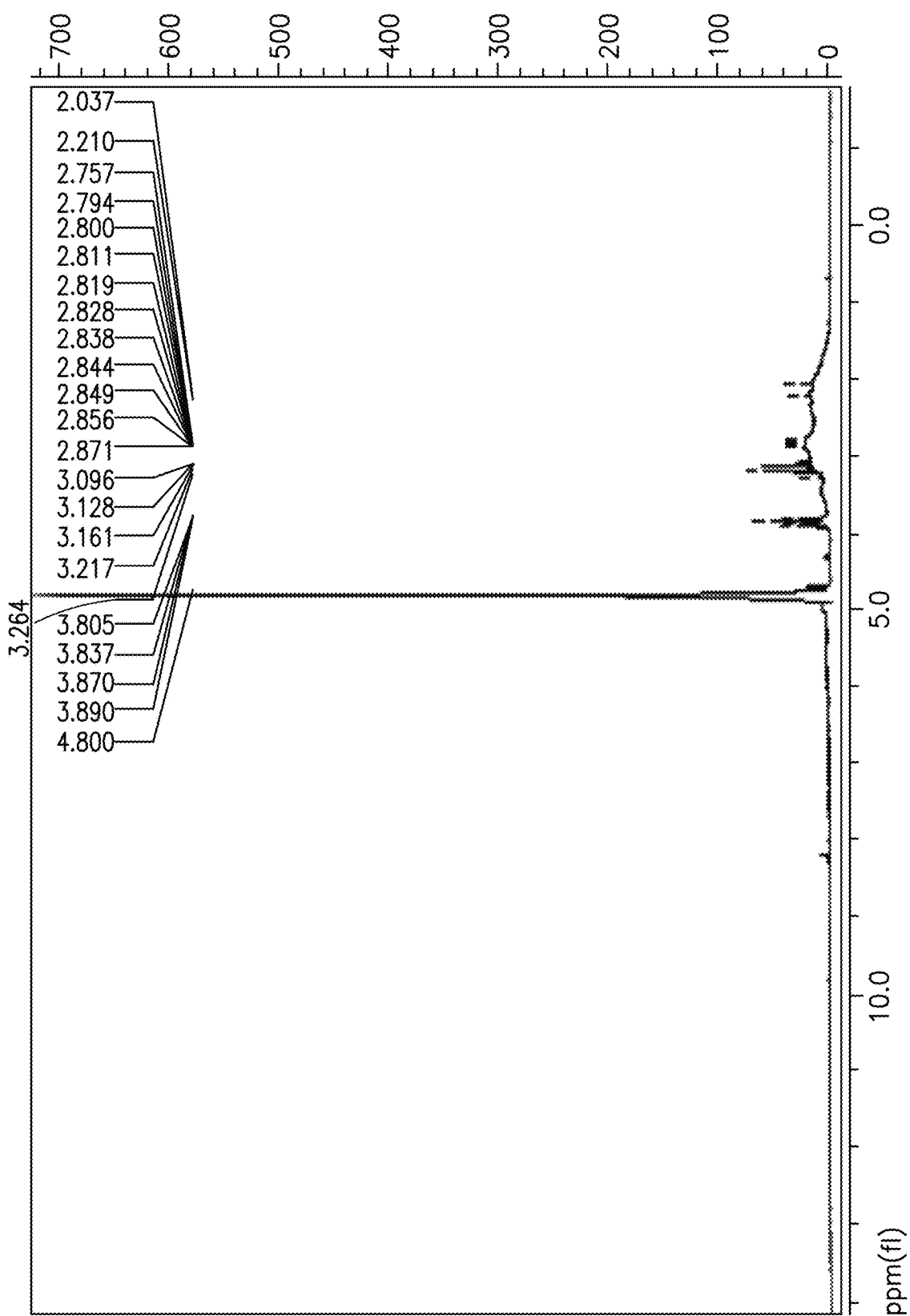
FIG. 2 shows product 1 $^1$H NMR spectrum.
Figure 3:
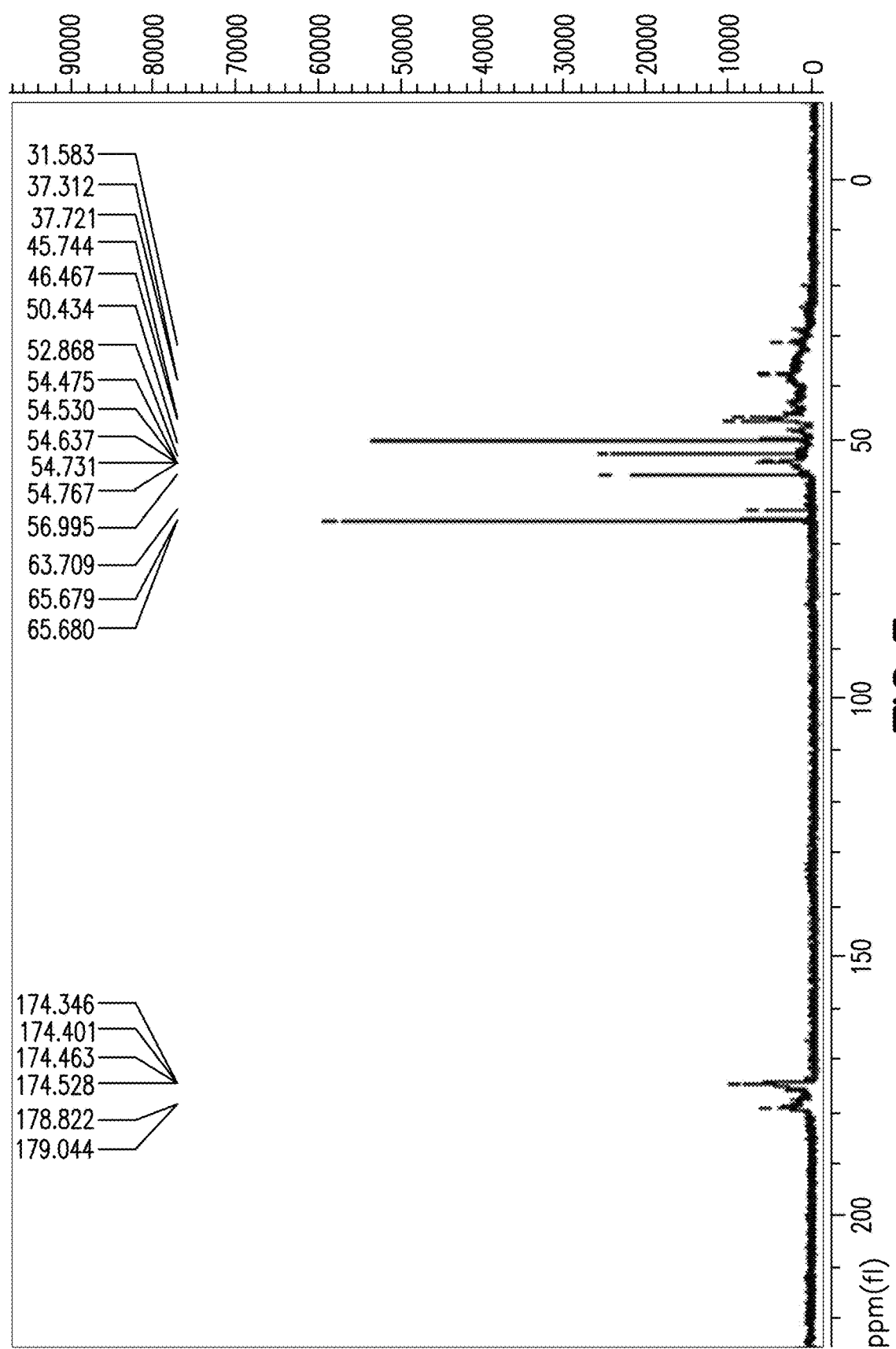
FIG. 3 shows product 1 $^{13}$C NMR spectrum.

In a 500 mL four-mouth round flask supplied with a magnetic stirrer, a condenser, an addition funnel and a thermometer, 240 gr of a solution containing 25% by weight of sodium vinyl sulfonate and 60 gr of itaconic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 0.6 gr of ammonium ferric sulfate dodecahydrate are added and vigorous stirring is maintained for 10 minutes. At a temperature of 90° C., 20 gr (17.9 mL) of an aqueous solution containing 30% by weight of hydrogen peroxide start being added to the homogeneous and clear solution at an addition rate of 0.07 mL/min. The system temperature is maintained at 94° C. (+/−2° C.). Once the addition process is completed, the reaction mixture is maintained under vigorous stirring and at a temperature of 94° C. (+/−2° C.) for 6 hours, time after which, 321 gr of a clear reddish liquid are obtained, which contains the random copolymer derived from itaconic acid and sodium vinyl sulfonate referred to as product 1, with an average molecular weight of 1509 AMU by number, an average molecular weight of 1705 AMU by weight and a polydispersity index of 1.13. These values were obtained by means of size exclusion chromatography (SEC), using a chromatography column with the trade name plaquagel MIXED-OH and an aqueous solution comprising sodium nitrate (0.2 M) and sodium phosphate, monobasic (0.01 M) at a pH of 7 as the mobile phase. Spectroscopic characteristics are the following: FTIR (cm$^{-1}$): 3431, 2939, 1713, 1407, 1154, 1036 and 715 (FIG. 1). $^1$H NMR (D$_2$O), 200 MHz, δ (ppm): multiple signals at the 1.77 to 2.33, 2.72 to 3.02, 3.37 to 3.44 intervals (FIG. 2). $^{13}$C NMR (D$_2$O), 50 MHz, δ (ppm): signals at the 23.2 to 31.5, 39.9 to 43.6, 49.1 to 58.5 and 176.9 to 181.4 intervals (FIG. 3).

Example 2 (Product 2)

In a 500 mL four-mouth round flask supplied with a magnetic stirrer, a condenser, an addition funnel and a thermometer, 240 gr of a solution containing 25% by weight of sodium vinyl sulfonate and 60 gr of itaconic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 0.6 gr of ammonium ferric sulfate dodecahydrate are added and vigorous stirring is maintained for 10 minutes. At a temperature of 90° C., 40 gr (35.8 mL) of an aqueous solution containing 30% by weight of hydrogen peroxide start being added to the homogeneous and clear solution at an addition rate of 0.07 mL/min. The system temperature is maintained at 94° C. (+/−2° C.). Once the addition process is completed, the reaction mixture is maintained with vigorous agitation and at a temperature of 94° C. (+/−2° C.) for 6 hours, time after which, 341 gr of a clear reddish liquid are obtained, which contains the random copolymer derived from itaconic acid and sodium vinyl sulfonate referred to as product 2, with an average molecular weight of 1482 AMU by number, an average molecular weight of 1690 AMU by weight and a polydispersity index of 1.14. These values were obtained by means of size exclusion chromatography (SEC), using a chromatography column with the trade name plaquagel MIXED-OH and an aqueous solution comprising sodium nitrate (0.2 M) and sodium phosphate, monobasic (0.01 M) at a pH of 7 as the mobile phase. Spectroscopic characteristics are the following: FTIR (cm$^{-1}$): 3433, 2941, 1715, 1403, 1152, 1032 and 713. $^1$H NMR (D$_2$O), 200 MHz, δ (ppm): multiple signals at the 1.76 to 2.32, 2.70 to 3.05, 3.35 to 3.42 intervals. $^{13}$C NMR (D$_2$O), 50 MHz, δ (ppm): signals at the 23.5 to 31.8, 39.1 to 43.2, 49.3 to 58.57 and 176.3 to 181.8.

Example 3 (Product 3)

In a 500 mL four-mouth round flask supplied with a magnetic stirrer, a condenser, an addition funnel and a thermometer, 84 gr of itaconic acid, 144 gr of a solution containing 25% by weight of sodium vinyl sulfonate and 72 gr of distilled water are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 0.6 gr of ammonium ferric sulfate dodecahydrate are added and vigorous stirring is maintained for 10 minutes. At a temperature of 90° C., 20 gr (17.9 mL) of an aqueous solution containing 30% by weight of hydrogen peroxide start being added to the homogeneous and clear solution at an addition rate of 0.07 mL/min. The system temperature is kept at 94° C. (+/−2° C.). Once the addition process is completed, the reaction mixture is maintained with vigorous stirring and at a temperature of 94° C. (+/−2° C.) for 6 hours, time after which, 320 gr of a clear reddish liquid are obtained, which contains the random copolymer derived from itaconic acid and sodium vinyl sulfonate referred to as product 3, with an average molecular weight by number of 1643 AMU, an average molecular weight by weight of 1890 AMU and a polydispersity index of 1.15. These values were obtained by means of size exclusion chromatography (SEC), using a chromatography column with the trade name plaquagel MIXED-OH and an aqueous solution composed of sodium nitrate (0.2 M) and sodium phosphate, monobasic (0.01 M) at a pH of 7 as the mobile phase. Spectroscopic characteristics are the following: FTIR (cm$^{-1}$): 3431, 2921, 1715, 1409, 1154, 1039 and 713. $^1$H NMR (D$_2$O), 200 MHz, δ (ppm): multiple signals at the 1.71 to 2.39, 2.74 to 3.09, 3.31 to 3.49 intervals. $^{13}$C NMR (D$_2$O), 50 MHz, δ (ppm): signals at the 23.4 to 31.3, 39.2 to 43.8, 49.2 to 58.1 and 176.2 to 181.1 intervals.

Example 4 (Product 4)

In a 500 mL four-mouth round flask supplied with a magnetic stirrer, a condenser, an addition funnel and a thermometer, 336 gr of a solution containing 25% by weight of sodium vinyl sulfonate and 36 gr of itaconic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 0.6 gr of ammonium ferric sulfate dodecahydrate are added and vigorous stirring is maintained for 10 minutes. At a temperature of 90° C., 20 gr (17.9 mL) of an aqueous solution containing 30% by weight of hydrogen peroxide start being added to the homogeneous and clear solution at an addition rate of 0.07 mL/min. The system temperature is kept at 94° C. (+/−2$^2$C). Once the addition process is completed, the reaction mixture is maintained stirring vigorously and at a temperature of 94° C. (+/−2$^2$C) for 6 hours, time after which, 392 gr of a clear reddish liquid are obtained, which contains the random copolymer derived from itaconic acid and sodium vinyl sulfonate referred to as product 4, with an average molecular weight of 1980 AMU by number, an average molecular weight of 2200 AMU by weight and a polydispersity index of 1.11. These values were obtained by means of size exclusion chromatography (SEC), using a chromatography column with the brand name plaquagel MIXED-OH and an aqueous solution composed of sodium nitrate (0.2 M) and sodium phosphate, monobasic (0.01 M) at a pH of 7 as the mobile phase. Spectroscopic characteristics are the following: FTIR (cm$^{-1}$): 3445, 2923, 1716, 1405, 1152, 1032 and 718. $^1$H NMR (D$_2$O), 200 MHz, δ (ppm): multiple signals at the 1.71 to 2.32, 2.75 to 3.06, 3.32 to 3.41 intervals. $^{13}$C NMR (D$_2$O), 50 MHz, δ (ppm): signals at the 22.5 to 31.9, 38.5 to 43.5, 49.6 to 58.9 and 175.6 to 181.1 intervals.

Example 5 (Product 5)

In a 500 mL four-mouth round flask supplied with a magnetic stirrer, a condenser, an addition funnel and a thermometer, 240 gr of a solution containing 25% by weight of sodium vinyl sulfonate and 60 gr of cis-glutaconic acid are mixed at room temperature and atmospheric pressure. Afterwards, the reaction mixture is stirred vigorously and heated up to a temperature of 90° C. under atmospheric pressure in order to obtain a mixture with a homogeneous and clear appearance. Once these conditions are attained, 0.6 gr of ammonium ferric sulfate dodecahydrate are added and vigorous stirring is maintained for 10 minutes. At a temperature of 90° C., 20 gr (17.9 mL) of an aqueous solution containing 30% by weight of hydrogen peroxide start being added to the homogeneous and clear solution at an addition rate of 0.07 mL/min. The system temperature is kept at 94° C. (+/−2° C.). Once the addition process is completed, the reaction mixture is maintained stirring vigorously and at a temperature of 94° C. (+/−2° C.) for 6 hours, time after which, 321 gr of a clear reddish liquid are obtained, which contains the random copolymer derived from cis-glutaconic acid and sodium vinyl sulfonate referred to as product 5, with an average molecular weight of 1589 AMU by number, an average molecular weight of 1810 AMU by weight and a polydispersity index of 1.14. These values were obtained by means of size exclusion chromatography (SEC), using a chromatography column with the trade name plaquagel MIXED-OH and an aqueous solution composed of sodium nitrate (0.2 M) and sodium phosphate, monobasic (0.01 M) at a pH of 7 as the mobile phase. Spectroscopic characteristics are the following: FTIR (cm$^{-1}$): 3429, 2933, 1711, 1411, 1135, 1032 and 711. $^1$H NMR (D$_2$O), 200 MHz, δ (ppm): multiple signals at the 1.70 to 2.33, 2.71 to 3.12, 3.33 to 3.54 intervals. $^{13}$C NMR (D$_2$O), 50 MHz, δ (ppm): signals at the 23.2 to 31.5, 39.9 to 43.6, 49.1 to 58.5 and 176.9 to 181.4 intervals.

Example 6 (Product 6)

In a 500 mL four-mouth round flask supplied with a magnetic stirrer, a condenser, an addition funnel and a thermometer, 336 gr of a solution containing 25% by weight of sodium vinyl sulfonate and 36 gr of cis-glutaconic acid are mixed at room temperature and atmospheric pressure. Afterwards, the reaction mixture is stirred vigorously and heated up to a temperature of 90° C. under atmospheric pressure in order to obtain a homogeneous and clear-appearing mixture. Once these conditions are attained, 0.6 gr of ammonium ferric sulfate dodecahydrate are added and vigorous stirring is maintained for 10 minutes. At a temperature of 90° C., 20 gr (17.9 mL) of an aqueous solution containing 30% by weight of hydrogen peroxide start being added to the homogeneous and clear solution at an addition rate of 0.07 mL/min. The system temperature is kept at 94° C. (+/−2° C.). Once the addition process is completed, the reaction mixture is maintained under vigorous agitation and at a temperature of 94° C. (+/−2° C.) for 6 hours, time after which, 392 gr of a clear reddish liquid are obtained, containing the random copolymer derived from cis-glutaconic acid and sodium vinyl sulfonate of the random type referred to as product 6, with an average molecular weight of 1860 AMU by number, an average molecular weight of 2150 AMU by weight and a polydispersity index of 1.16. These values were obtained by means of size exclusion chromatography (SEC), using a chromatography column with the brand name plaquagel MIXED-OH and an aqueous solution composed of sodium nitrate (0.2 M) and sodium phosphate, monobasic (0.01 M) at a pH of 7 as the mobile phase. Spectroscopic characteristics are the following: FTIR (cm$^{-1}$): 3434, 2919, 1713, 1401, 1165, 1034 and 716. $^1$H NMR (D$_2$O), 200 MHz, δ (ppm): multiple signals at the 1.69 to 2.36, 2.72 to 3.16, 3.31 to 3.51 intervals. $^{13}$C NMR (D$_2$O), 50 MHz, δ (ppm): signals at the 22.7 to 31.5, 37.5 to 44.5, 48.6 to 59.5 and 175.1 to 181.5 intervals.

3) Experimental Evaluation of Mineral Salts Scale Inhibiting and Dispersing Properties of the Random Copolymers.

The assessment of the copolymers anti-scaling and dispersant capabilities were performed by means of eight different tests: a) Determination of calcium sulfate and carbonate mineral scale inhibition, b) Determination of calcium sulfate and carbonate crystal distortion and modification by scanning electron microscopy, c) Determination of calcium carbonate and calcium, barium and strontium sulfates scale inhibition, d) Determination of calcium carbonate scale inhibition in a medium with the characteristics of cooling systems, e) Determination of efficiency as inorganic salts dispersant, f) Determination of mineral scale inhibition under reservoir conditions (high temperature and high pressure), g) Determination of prevention and remediation of formation damage by mineral scale under reservoir conditions and h) Determination of prevention and remediation of damage to the formation by calcium sulfate precipitation with incompatible brine mixture in a limestone nucleus under high temperature, high pressure and high salinity conditions.

a) Determination of Calcium Sulfate and Carbonate Mineral Scale Inhibition. For Calcium Sulfate.

The method consists in mixing two solutions to induce the formation of calcium sulfate.

1.—Two solutions are prepared containing the calcium and sulfate ions, respectively.
   a) Solution containing calcium ions: it contains 7.5 g/L of NaCl+11.1 g/L of CaCl$_2$.2H$_2$O.
   b) Solution containing sulfate ions: it contains 7.5 g/L of NaCl+10.66 g/L of NA$_2$SO$_4$.

2.—The desired inhibitor concentration is prepared in the solution containing the sulfate ions.

3.—50 ml of each solution and the desired inhibitor concentration are mixed and everything is poured into a 250 mL hermetically sealed flask.

4.—The flasks are placed in an oven for 24 hours at a constant temperature of 70° C.

5.—After 24 hours, the flasks are allowed to cool down to room temperature. Solids that may have been formed are filtered and a 1 ml sample is taken and completed to 10 ml with ultra-pure water.

6.—The solution is analyzed by means of inductive coupling plasma (ICP), in order to obtain the remaining concentration of calcium ions in the solution.

A control is prepared, containing only the amount of calcium ions present in the blank. The inhibition percentage was estimated with the expression (1).

$$\% \text{ Inhibition} = \frac{Ca^{+2}_{sample\ after-the-precipitation} - Ca^{+2}_{Reference\ after-the-precipitation}}{Ca^{+2}_{control} - Ca^{+2}_{Reference\ after-the-precipitation}} * 100 \quad (1)$$

Example 7

The determination of the calcium sulfate scale inhibitory capability was carried out for product 1.

Table 5 below shows the results for product 1 at different concentrations.

TABLE 5

Calcium sulfate inhibition results

| Product | Concentration | Calcium concentration (ppm) | Efficiency (%) |
|---|---|---|---|
| Control solution | — | 1510 | — |
| Reference | — | 1017 | 0 |
| Product 1 | 200 | 1509 | 99.8 |
|  | 400 | 1510 | 100 |
|  | 600 | 1508 | 99.5 |
| Product 5 | 200 | 1503 | 98.6 |
|  | 400 | 1500 | 98.0 |
|  | 600 | 1476 | 93.1 |

For Calcium Carbonate.

Precipitations of this mineral phase were induced by mixing two brines, wherein one of the brines was referred to as control solution containing the total amount of calcium ions and the combination of the aforementioned two brines was referred to as reference. The method consists of the following:

1.—Two solutions are prepared containing the calcium and sulfate ions, respectively.
   a) Solution containing the calcium ions: 6.075 g/L of CaCl$_2$.2H$_2$O, 3.68 g/L of MgCl$_2$.6H$_2$O and 33 g/L of NaCl.
   b) Solution containing the bicarbonate ions: 3.68 g/L of NaHCO$_3$ and 33 g/L of NaCl.

2.—The desired inhibitor concentration is prepared in the solution containing the bicarbonate ions.

3.—10 ml of each solution and the desired inhibitor concentration are mixed and everything is poured into a 25 mL hermetically sealed flask.

4.—The flasks are placed in an oven for 24 hours at a constant temperature of 70° C.

5.—After 24 hours, the flasks are allowed to cool down to room temperature. Solids that may have been formed are filtered and a 1 ml sample is taken and completed to 10 ml with distilled water.

6.—The solution is analyzed by means of inductive coupling plasma (Perkin Elmer dual view ICP-OES-DV, model 7300 DV) and the EPA 3010c methodology, in order to obtain the remaining concentration of calcium ions in the solution.

A control containing only the amount of calcium present in the blank was prepared. The inhibition percentage was calculated with the expression (2).

$$\% \text{ Inhibition} = \frac{Ca^{+2}_{sample\ after-the-precipitation} - Ca^{+2}_{Reference\ after-the-precipitation}}{Ca^{+2}_{control} - Ca^{+2}_{Reference\ after-the-precipitation}} * 100 \quad (2)$$

Example 8

The determination of the calcium carbonate scale inhibitory capability was carried out for product 1.

Table 6 below shows the results for product 1 at different concentrations.

TABLE 6

Calcium carbonate inhibition results.

| Product | Concentration | Calcium concentration (ppm) | Efficiency (%) |
|---|---|---|---|
| Control solution | — | 798 | — |
| Reference | — | 400 | 0 |
| Product 1 | 25 | 785 | 95.5 |
| | 50 | 789 | 97.7 |
| | 75 | 795 | 99.2 |
| | 100 | 794 | 98.9 |
| | 250 | 796 | 99.5 |
| | 500 | 797 | 99.7 |
| Product 6 | 50 | 780 | 95.5 |
| | 75 | 795 | 99.2 |
| | 100 | 793 | 98.7 | b) Determination of Calcium Sulfate and Carbonate Crystals Distortion and Modification by Scanning Electron Microscopy.

For Calcium Sulfate.

1.—The solutions containing the calcium and sulfate ions are the following:
  a) Solution containing the calcium ions: it contains 7.5 g/L of NaCl+22.2 g/L of $CaCl_2 \cdot 2H_2O$.
  b) Solution containing the sulfate ions: it contains 7.5 g/L of NaCl+21.32 g/L of $Na_2SO_4$.
2.—The desired inhibitor concentration is prepared in the solution containing the sulfate ions.
3.—5 ml of each solution and the desired inhibitor concentration are mixed and everything is poured into a 25 mL hermetically sealed tube.
4.—The tubes are placed in an oven for 24 hours at a constant temperature of 70° C.
5.—After 24 hours, the containers are allowed to cool down to room temperature without exceeding 2 hours. Solids that may have formed are filtered.
6.—Solids formed in the tubes are analyzed and their morphology is observed by scanning electron microscopy (SEM).

Example 9

In order to determine the effect of the copolymers derived from the present invention on calcium sulfate crystals, product 1 was evaluated using two brines with high concentrations of calcium and sulfate ions.

Figure 4:
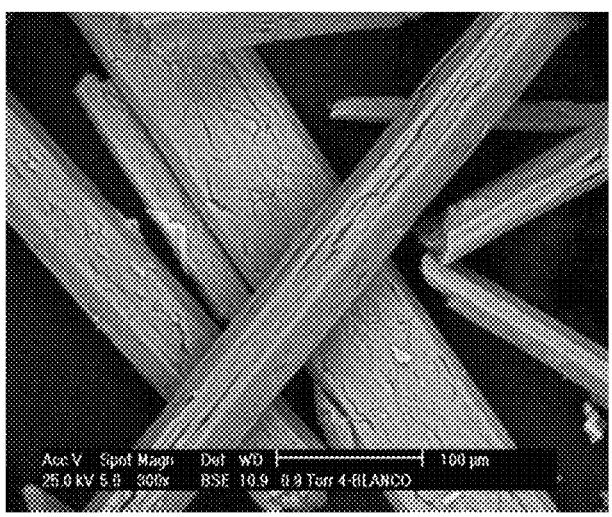
FIG. 4 shows the morphology and composition of calcium sulfate crystals, a) without chemical product, and b) with 200 ppm of product 1.
Figure 4:
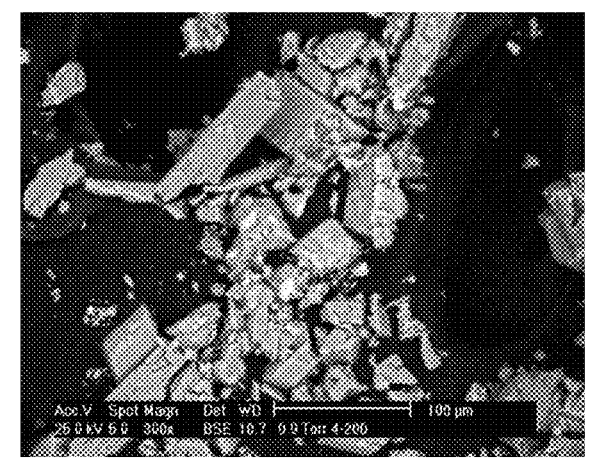
Figure 5A:
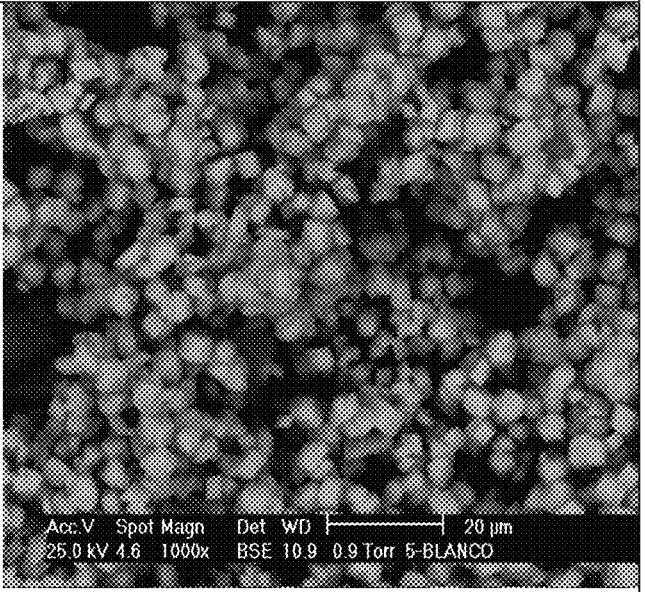
FIGS. 5A-5D shows the morphology and composition of calcium carbonate crystals, a) without chemical product and at different concentrations of product 1, b) 50 ppm, c) 100 ppm, d) 200 ppm, e) 400 ppm, f) 600 ppm and g) 800 ppm.
Figure 5A:
Figure 5B:
Figure 5B:
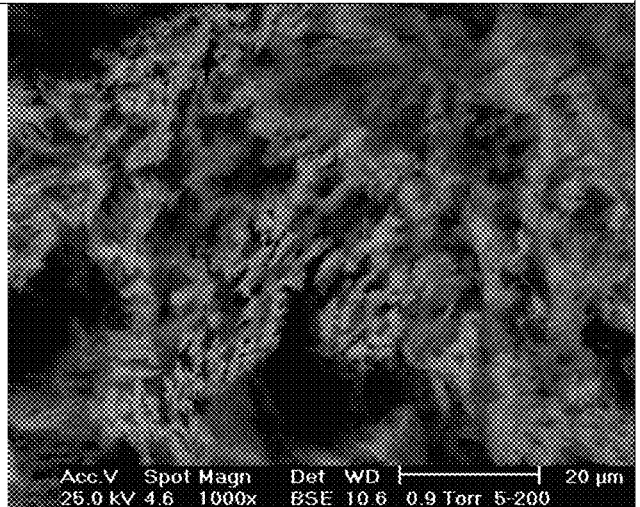
Figure 5C:
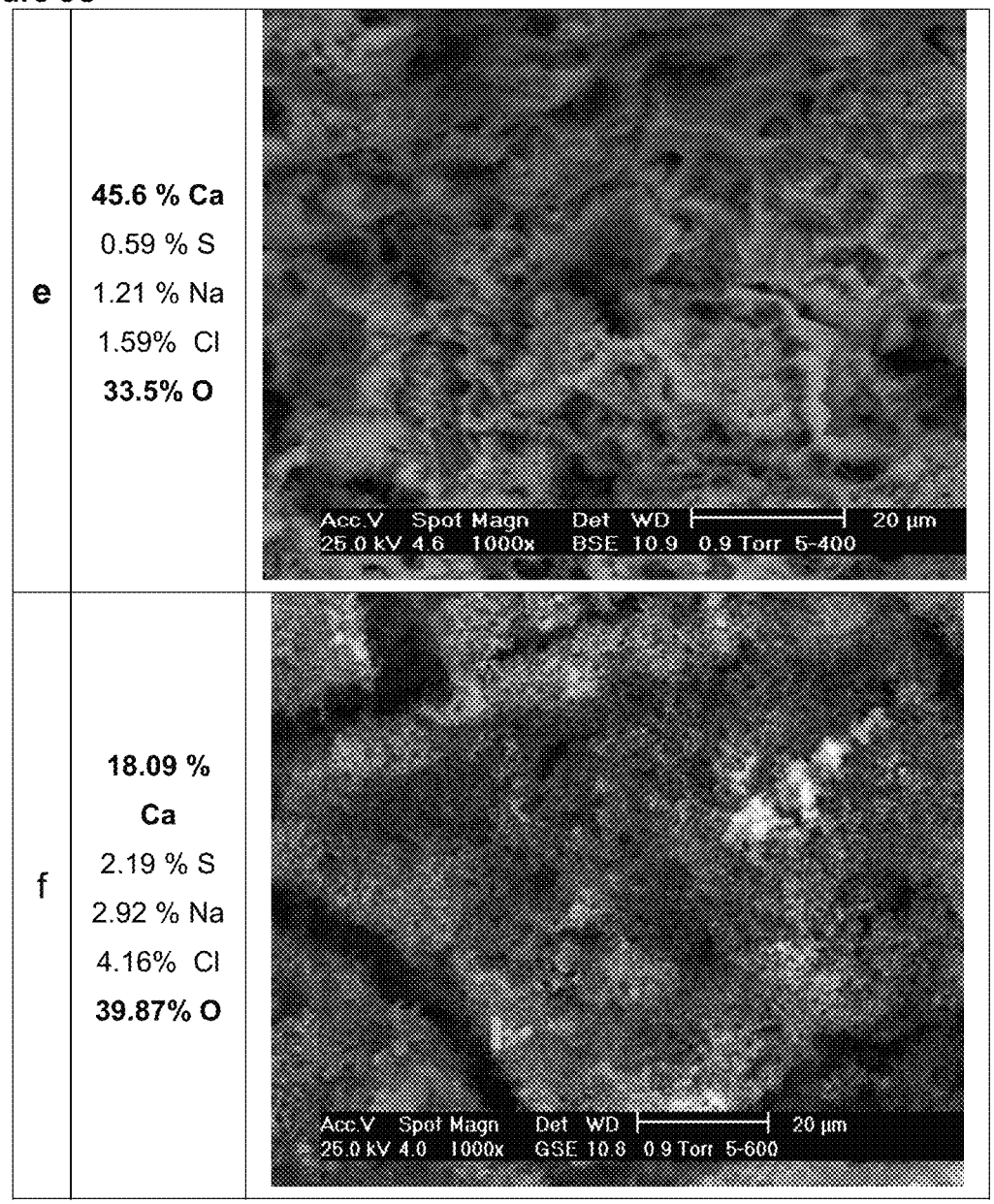
Figure 5D:
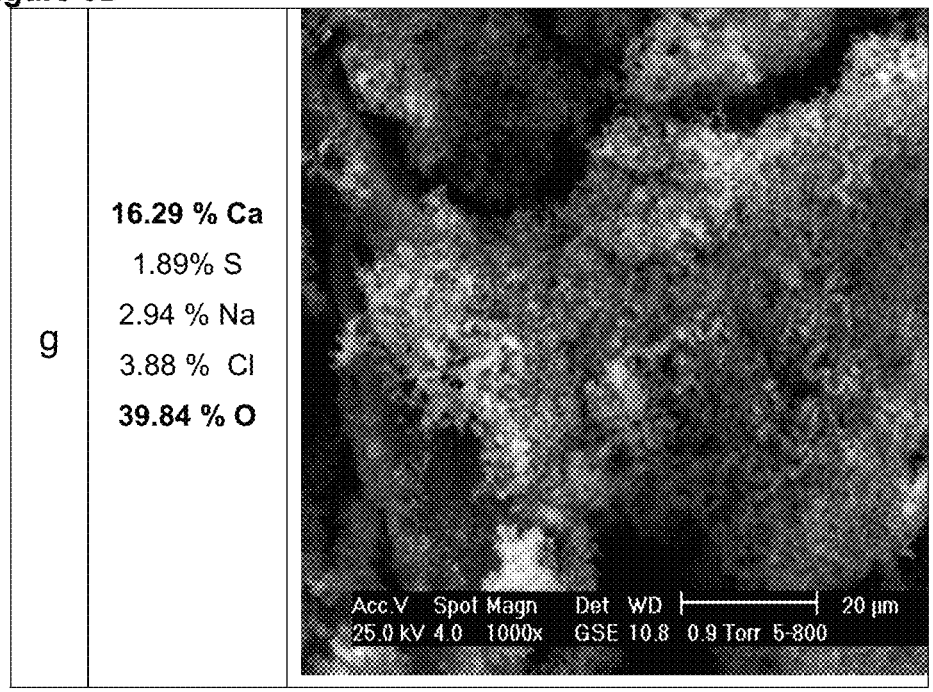

FIG. 4 shows the images and compositions of the crystals resulting from the mixture of the solutions for: a) without chemical product and b) with 200 ppm of product 1. Noteworthy, it is possible to observe clearly how product 1 breaks up and distorts the calcium sulfate crystals, thereby inhibiting the growth of larger crystals.

For Calcium Carbonate.

1.—Solutions containing the calcium and bicarbonate ions are the following:
  a) Solution containing the calcium ions: 12.15 g/L $CaCl_2 \cdot 2H_2O$, 3.68 g/L $MgCl_2 \cdot 6H_2O$ and 33 g/L of NaCl.
  b) Solution containing the bicarbonate ions: 7.36 g/L $NaHCO_3$ and 33 g/L NaCl.
2.—The desired inhibitor concentration is prepared in the solution containing the sulfate ions.
3.—5 ml of each solution and the desired inhibitor concentration are mixed and everything is poured into a 25 mL hermetically sealed tube.
4.—The tubes are placed in an oven for 24 hours at a constant temperature of 70° C.
5.—After 24 hours, the tubes are allowed to cool down to room temperature without exceeding 2 hours. Solids that may have formed are filtered.
6.—Solids formed in the tubes are analyzed and their morphology is observed by scanning electron microscopy (SEM).

Example 10

In order to determine the effect of the copolymers derived from the present invention on calcium carbonate crystals, product 1 was evaluated using two brines with high concentrations of calcium and bicarbonate ions.

FIGS. 5A-5D shows the images and compositions of the crystals resulting from the mixture of the solutions without chemical product and from the mixture of the solutions with product 1, for: a) without chemical product and at different concentrations of product 1, b) 50 ppm, c) 100 ppm, d) 200 ppm, e) 400 ppm, f) 600 ppm and g) 800 ppm. Of note, it is possible to observe clearly how product 1 breaks up and distorts the calcium carbonate crystals at the concentration range of 50 to 800 ppm, thereby inhibiting the growth of the crystals. Furthermore, the chemical compound obtained by means of chemical analysis shows the presence of sulfur in all solids, which confirms the presence of product 1 and hence the formation of supramolecular complexes and their effect on the calcium carbonate crystals morphology distortion.

c) Determination of Calcium Carbonate and Calcium, Barium and Strontium Sulfates Scale Inhibition.

1.—Two brines are prepared containing the calcium strontium, barium, sulfates and bicarbonate ions. The compositions of these brines are described in Table 7.
2.—The desired inhibitor concentration is prepared in brine A.
3.—5 ml of each one of brines A and B and the desired inhibitor concentration are mixed and everything is poured into a 25 mL hermetically sealed flask and stirred.
4.—The system turbidity is measured.

TABLE 7

Compositions of the employed brines.

| Salt | Brine A (ppm) | Brine B (ppm) |
|---|---|---|
| NaCl | 101564 | 3966 |
| KCl | 4157 | 147 |
| $MgCl_2$ | 26031 | 286 |
| $CaCl_2$ | 119811 | 833 |
| $SrCl_2$ | 2282 | — |
| $BaCl_2$ | 1832 | — |
| $Na_2SO_4$ | — | 1874 |
| $NaHCO_3$ | — | 260 |
| $Na_2CO_3$ | — | 4 |

Example 11

In order to determine the effect of the copolymers derived from the present invention on a system containing high concentrations of calcium, barium and strontium ions, as well as sulfate and bicarbonate ions, products 1-4 were assessed in the mixture of brines A and B.

Table 8 below shows the turbidity results in NTU (nephelometric units) from the mixture of the solutions without chemical product and from the mixture of the solutions with products 1-4 and from a commercial copolymer.

TABLE 8

Turbidity results in the inhibition of scale of: $CaCO_3$, $CaSO_4$, $BaSO_4$ and $SrSO_4$.

| Product | Turbidity at 25 ppm (NTU) | Turbidity at 50 ppm (NTU) |
|---|---|---|
| Blank | <1000 | <1000 |
| Acrylic acid-sodium vinyl sulfonate-derived copolymer (Mn = 2600 UMA) | 120 | 105 |
| Product 1 | 12.5 | 7.6 |
| Product 2 | 22.1 | 16.2 |
| Product 3 | 28.9 | 25.1 |
| Product 4 | 31.1 | 27.3 | d) Determination of Inhibition of the Characteristic Calcium Carbonate Scale ($CaCO_3$) of a Cooling System.

This method determines the efficiency of calcium carbonate salts scale inhibitors.

Preparation of Solutions.

Sodium carbonate solution ($Na_2CO_3$).
0.424 g of $Na_2CO_3$ is weighted in 1 L of demineralized water.

Calcium chloride solution ($CaCl_2$).
0.444 g of $CaCl_2$ is weighted in 1 L of demineralized water.

A solution of 10 000 ppm of the additive is prepared in demineralized water.

Preparation of Samples.
1. 100 mL of the $Na_2CO_3$ solution are poured in a 250 mL flask with an air-tight cap.
2. The concentration to be evaluated is added in mL (1, 5, 10 and 25 ppm).
3. 100 mL of the $CaCl_2$ solution are poured and the flask is shaken.
4. A blank is prepared as in points 1 and 3 composed of $Na_2CO_3$ and $CaCl_2$ solutions without inhibitor and shaken.
5. All the flasks are closed and placed in the oven for 24 hours at 70° C.
6. Once the testing time is completed, the flasks are removed from the oven and left to cool down.
7. A reference solution without inhibitor composed of $Na_2CO_3$ and $CaCl_2$ solutions is prepared as in points 1 and 3.
8. The amount of calcium ions in solution is determined for the stock solution, for the blank and for the samples.

Table 9 shows a summary of the testing conditions.

TABLE 9

Testing conditions.

| Calcium Hardness ($CaCO_3$) | 200 ppm |
| Temperature | 70° C. |
| Test time | 24 hr. |
| Scale inhibitor concentration | 5 and 10 ppm |

Determination of Hardness as $CaCO_3$.
1. An aliquot is taken from the center of the sample bottle at room temperature and at rest without having shaken it since its removal from the oven.
2. The amount of calcium ions is determined by titration with EDTA (ethylenediaminetetraacetic acid disodic salt).

Efficiency Percentage Calculation:

$$\text{Efficiency} = \frac{\text{sample } EDTA \text{ mL spent} - \text{blank } EDTA \text{ mL spent}}{\text{reference solution } EDTA \text{ mL spent} - \text{blank } EDTA \text{ mL spent}} * 100$$

Example 12

The determination of the inhibitory capability of calcium carbonate scale typical of cooling systems was carried out for products 1-4 and for polymers commercially used as scale inhibitors.

Table 10 below shows the efficiency results at different concentrations.

TABLE 10

Efficiency results of polymers as scale inhibitors.

| Sample | Efficiency at 5 ppm | Efficiency at 10 ppm |
|---|---|---|
| Poly(acrylic acid) | 63.8 | 81.6 |
| Copolymer (acrylic acid and sodium vinyl sulfonate) | 68.3 | 83.1 |
| Product 1 | 95.6 | 98.4 |
| Product 2 | 98.8 | 99.1 |
| Product 3 | 97.8 | 98.3 |
| Product 4 | 98.6 | 98.8 | e) Determination of Efficiency as Inorganic Salts Dispersants.

These methods consist in determining the performance of the synthesized polymeric compounds in the dispersion of iron oxides, calcium carbonates and clays at different concentrations, through the measurement of turbidity in NTU (nephelometric turbidity units), where the dispersant action is more efficient at higher turbidity values.

Figure 6:
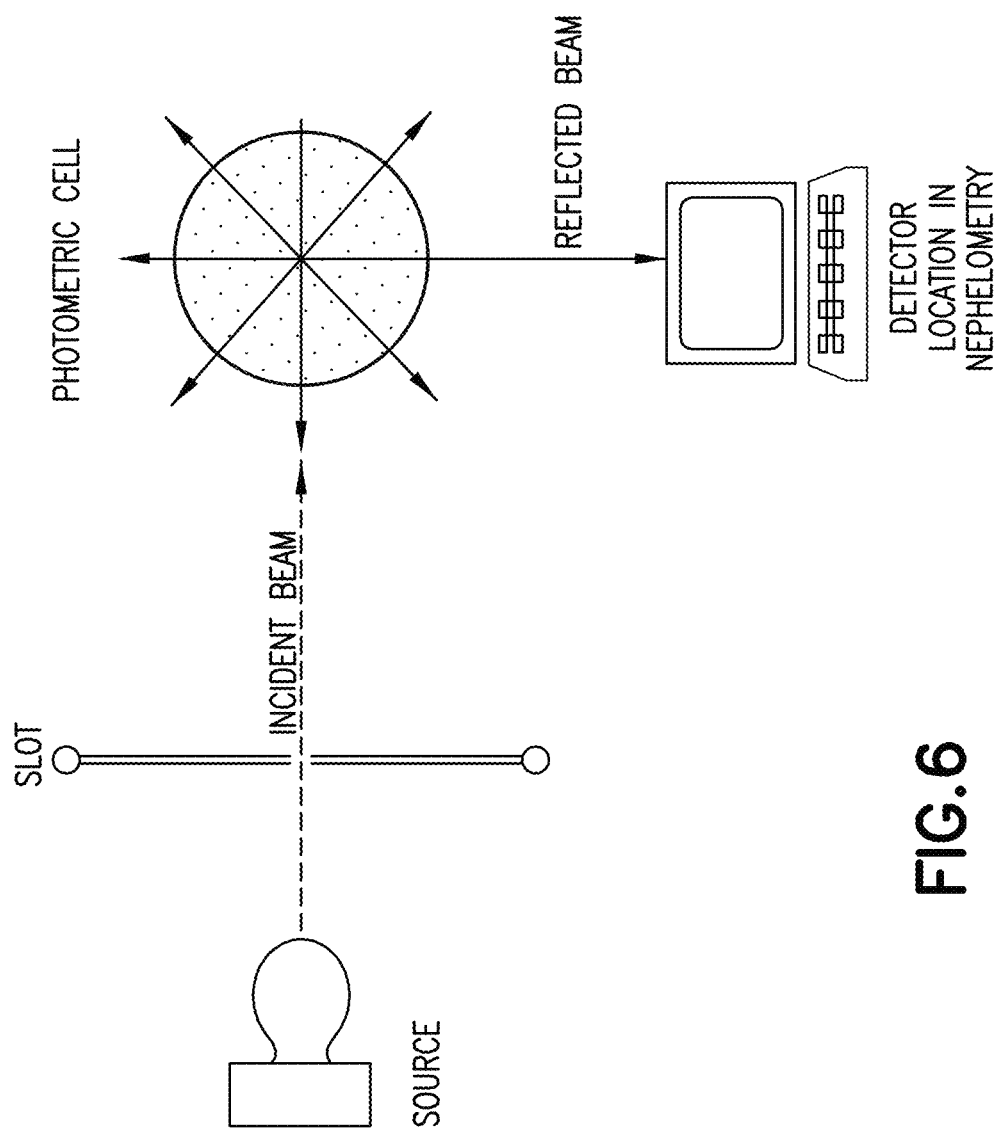
FIG. 6 shows the fundamentals of a photometer operation.

The measurement is founded on applying the nephelometric technique using a photometer (FIG. 6). The standard method is based on the comparison of the amount of light dispersed by colloidal particles present in a water sample, with the intensity of the light emerging through the same sample. Turbidity is expressed in turbidity units (NTU), where a turbidity unit equals a formalin suspension in water with a concentration of 1 ppm. The measurement of turbidity allows for the polymeric chains dispersant effect to be evaluated.

Calcium Carbonate Dispersion Evaluation.

For this test, from sodium carbonate and calcium chloride salts, a brine with a hardness of 200 ppm as calcium carbonate was used, and 750 ppm reactive-degree calcium carbonate was added in order to measure the effect of the polymer on calcium carbonate dispersion, at a dispersant concentration of 10 ppm, for a 2-hour period.

Example 13

The determination of the characteristic calcium carbonate dispersant capability was carried out for products 1-4.

The dispersant effect results for the copolymers of the present invention and for commercial polymers used as inorganic salts dispersants and their respective molecular weights are shown in Table 11. The results show that products 1 to 4 work better at dispersing calcium carbonate than acrylic acid-derived homopolymers and acrylic acid and sodium vinyl sulfonate copolymers.

TABLE 11

Turbidity results for different polymers.

| Sample | Turbidity (NTU) | Average Molecular Weight by number (Mn) (AMU) |
|---|---|---|
| Poly(acrylic acid) | 55.1 | 3297 |
| Poly(acrylic acid) | 23.5 | 2914 |
| Copolymer (acrylic acid and sodium vinyl sulfonate) | 19.4 | 7958 |
| Copolymer (acrylic acid and sodium vinyl sulfonate) | 17.3 | 4996 |
| Product 1 | 167.2 | 1509 |
| Product 2 | 153.1 | 1482 |
| Product 3 | 111.8 | 1643 |
| Product 4 | 146.8 | 1980 |

Iron Oxide Dispersion Assessment.

One of the problems that most affect aqueous systems is the presence of iron oxides, due to the dissolution of metal by corrosion effects. This method consists in evaluating the dispersant power of the synthesized polymers as follows:

A solution is prepared with hardness as calcium carbonate of 200 ppm, 750 ppm of iron oxide and with the dispersant polymer or copolymer added. The mixture is shaken and left to rest for a 4-hour time period. At the conclusion of the test, an aliquot is taken and turbidity is measured.

Example 14

The determination of the iron oxide-dispersant capability was carried out for Products 1-4.

The results of the iron oxide dispersion test by the copolymers of the present invention and by commercial polymers used as inorganic salts dispersants and their respective molecular weights are shown in Table 12.

Table 12 results show that products 1-4 work better than the acrylic acid-derived homopolymers and the acrylic acid and sodium vinyl sulfonate copolymers.

TABLE 12

Turbidity results for different polymers.

| Sample | Turbidity (NTU) | Average molecular weight by number (Mn) (AMU) |
|---|---|---|
| Poly(acrylic acid) | 376.3 | 3297 |
| Poly(acrylic acid) | 345.2 | 2914 |
| Copolymer (acrylic acid and sodium vinyl sulfonate) | 465.5 | 7958 |
| Copolymer (acrylic acid and sodium vinyl sulfonate) | 498.2 | 4996 |
| Product 1 | 910.1 | 1509 |
| Product 2 | 897.1 | 1482 |
| Product 3 | 888.6 | 1643 |
| Product 4 | 874.5 | 1980 |

Clay Dispersion Assessment.

For the purpose of this test, a brine with a hardness of 200 ppm as calcium carbonate and 1000 ppm of clay (kaolin) was prepared by putting these substances in contact and adding the dispersant, prepared at a 5 ppm concentration.

Once mixed, the compound is vigorously stirred in a magnetic stirring plate for 5 minutes and left to rest for 2 hours; once this time is elapsed, the respective turbidity measurements are performed.

Example 15

A determination of the clay-dispersing capability was carried out for products 1-4.

The results of the clay (kaolin) dispersion test for the copolymers of the present invention and for commercial polymers used as inorganic salts dispersants and their respective molecular weights are shown in Table 13.

TABLE 13

Turbidity results for different polymers.

| Sample | Turbidity (NTU) | Average molecular weight by number (Mn) (AMU) |
|---|---|---|
| Poly(acrylic acid) | 567.7 | 3297 |
| Poly(acrylic acid) | 550.6 | 2914 |
| Copolymer (acrylic acid and sodium vinyl sulfonate) | 413.6 | 7958 |
| Copolymer (acrylic acid and sodium vinyl sulfonate) | 407.7 | 4996 |
| Product 1 | 896.1 | 1509 |
| Product 2 | 987.4 | 1482 |
| Product 3 | 950.2 | 1643 |
| Product 4 | 911.1 | 1980 |

Table 13 results show that copolymers described in Examples 1 to 4 perform better at dispersing clays than the acrylic acid-derived homopolymers and acrylic acid and sodium vinyl sulfonate copolymers commonly used as inorganic salts dispersants.

f) Determination of Mineral Scale Inhibition at Reservoir Conditions (High Pressure and High Temperature) Typical of Oil Reservoirs.

The assessment as mineral scale inhibitor was carried out for the copolymer described in example 1 (product 1), which was dissolved in a mixture of two incompatible brines under reservoir conditions (high pressure and high temperature).

Assessment Methodology.

1.—The equipment to be used is cleaned:
    Window
    IPR (inverse pressure regulator)
    Transfer cylinder
2.—The monitoring gauges are calibrated:
    Pressure
    Temperature
3.—The system is assembled.
4.—The mixture of waters with and without product is injected at the required pressure.

5.—The temperature is elevated to the required condition and pressure is maintained by means of the IPR.
6.—The system is isolated and pressure and temperature are continuously monitored.
7.—Photographic images are taken during the tests to observe their performance and possible formation of crystals.

Figure 7:
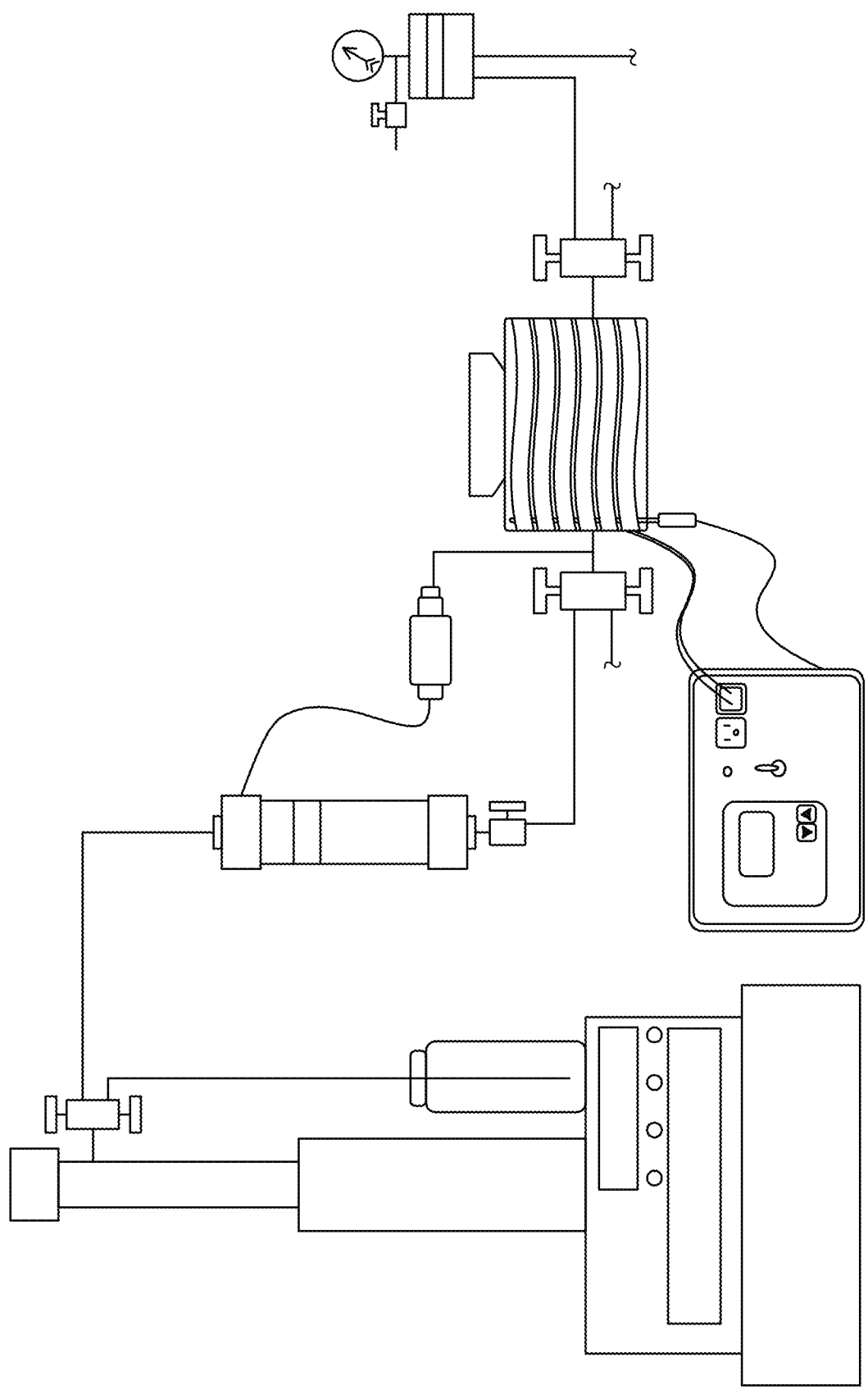
FIG. 7 illustrates the system to assess the compatibility of waters under reservoir conditions.

FIG. 7 shows a scheme of the high pressure and high temperature system used to carry out the mineral scale inhibition determination under reservoir conditions (high pressure and high temperature) typical of reservoirs, which consists of injection pumps, transfer cylinders, inverse pressure regulator, temperature control system, pressure monitoring system, digital camera and experimental cell.

Example 16

The determination of mineral scale inhibitory capability was carried out for product 1 at reservoir conditions.

Tables 14 and 15 show the composition of the brines used in the experiment.

TABLE 14

Compositions of the brines.

|  | Brine 1 mg/L | Brine 2 mg/L |
| --- | --- | --- |
| Cations |  |  |
| Sodium | 11742.09 | 101894 |
| Calcium | 448 | 24709.6 |
| Magnesium | 1288.43 | 341.9 |
| Iron | 0.1 | 0.01 |
| Barium | — | 23.91 |
| Strontium | 7.84 | 1417 |
| Anions |  |  |
| Chlorides | 19900 | 112106 |
| Sulfates | 3650 | 145.9 |
| Carbonates | 13.12 | 0 |
| Bicarbonates | 84.18 | 145.18 |

TABLE 15

Brines hardness and salinity.

|  | Brine 1 (mg/L) | Brine 2 (mg/L) |
| --- | --- | --- |
| Total hardness as $CaCO_3$ | 6420 | 63181 |
| Calcium hardness as $CaCO_3$ | 1120 | 61774 |
| Magnesium hardness as $CaCO_3$ | 5300 | 1407 |
| Salinity as NaCl | 32804 | 214000 |

Testing Conditions
　Temperature: 163° C.
　Pressure: 5,500 psi
Waters were mixed at a 3:1 ratio, (brine 1/brine 2)
Results The duration of the test was about 20 hours, time during which the system conditions were maintained constant at a temperature of 163° C. and a pressure of 5,500 psi.

During this time, the performance of the system was monitored and photographic images were taken to assess the presence or formation of mineral precipitates.

Figure 8:
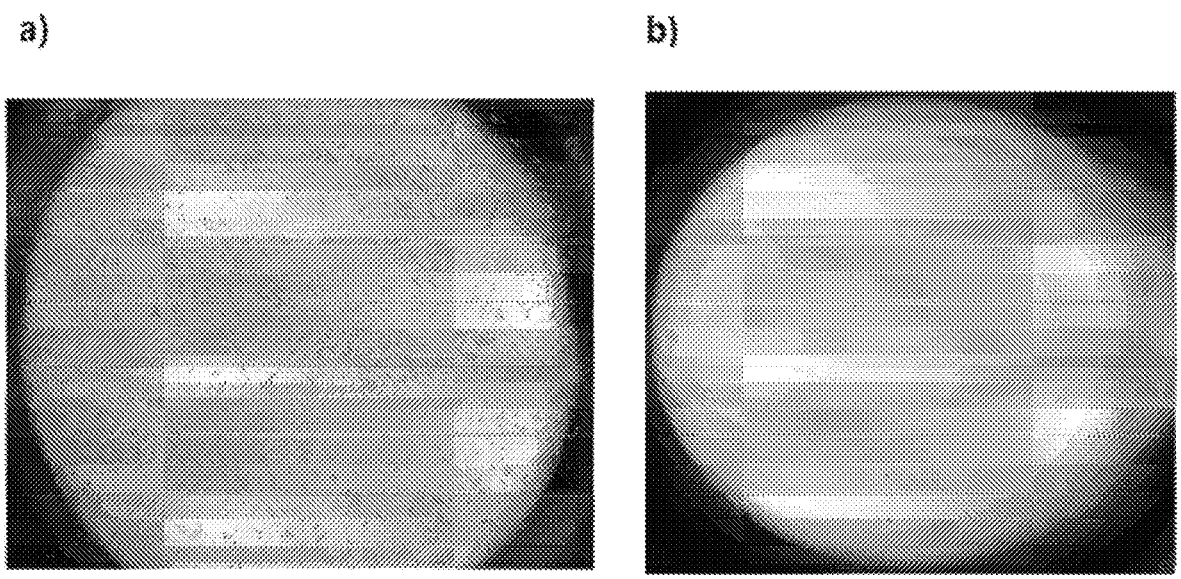
FIG. 8 shows the high-pressure and high-temperature windows containing: a) Formation water+Sea water mixture, and b) Formation water+Sea water+Product 1 mixture.

FIG. 8 shows photographic images for: a) Formation water+Sea water mixture and b) Formation water+Sea water+200 ppm of Product 1 mixture.

Making a comparison between the image taken at the initial condition and those taken at different time-points, under the same pressure and temperature conditions, no mineral precipitate formation is observed, thus proving product 1 performance as scale inhibitor under high salinity, high pressure and high temperature conditions.

g) Determination of the Control of Damage to the Formation in a Secondary Oil-Recovery Experiment by Injecting Water into a System of Full-Diameter Stacked Cores.

For the performance of this test, the historical behavior of fluid pressure and flow in the reservoir during the primary exploitation stage was established to subsequently represent the secondary recovery stage by water injection.

The experiment consists basically in first emulating the historical pressure behavior by escalating the reservoir lifetime, to subsequently make the injection of water at the previously established pressure condition.

Stage 1.

The system is under initial pressure and temperature conditions. To reproduce the primary exploitation stage, a pressure fall is generated by production of oil by the upper part of the cell until a pressure is reached at which the water injection stage is initiated, above the hydrocarbon mixture saturation pressure.

Stage 2.

At this stage, the recovery process by water injection is simulated. It starts with the injection of sea water.

Experimental Procedure.

The experiments are performed using the following procedure:

1.—The nuclei are cleaned with solvents and placed in the container.
2.—They are dried and vacuum is applied.
3.—They are saturated at 100% with typical formation brine.
4.—By means of helium injection and vacuum, the water saturation characteristics of the formation are obtained.
5.—The test sample is saturated with oil and aged for approximately 6 weeks at reservoir temperature and pressure conditions.
6.—The system is depressurized according to the production history of the reservoir.
7.—The brine that is characteristic of the formation and incompatible with the formation water is injected at a controlled flow.
8.—The produced oil and water are measured.

Example 17

The determination of the capability to prevent and control damage to the carbonated rock formation in a carbonated reservoir with a system of full-diameter stacked cores-at reservoir conditions (163° C. and 5500 psi) was carried out using brine 1 (injection water) and brine 2 (formation water), the compositions of which are described in Example 16.

The system of full-diameter stacked cores saturation with brine 2 described in Example 16 was established at 23.34%.
Results When brine 1 was injected to the system of full-diameter stacked cores, approximately 10% oil recovery was obtained, due to the damage caused by incompatibility with brine 2.

Figure 9:
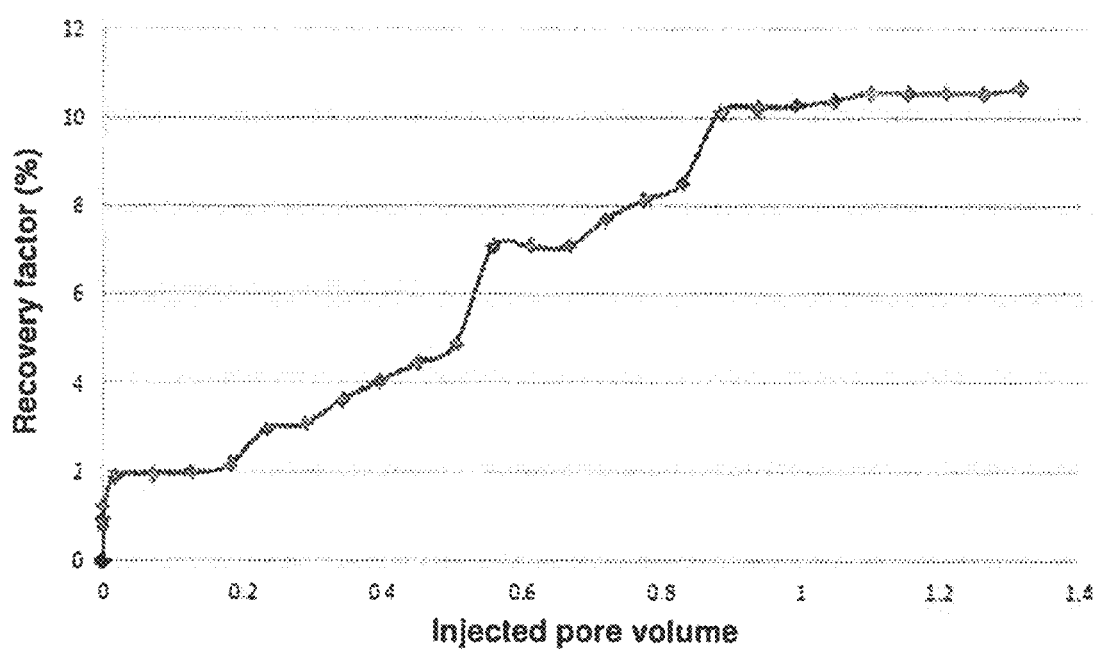
FIG. 9 shows a recovery factor versus injected pore volume graph.
Figure 10:
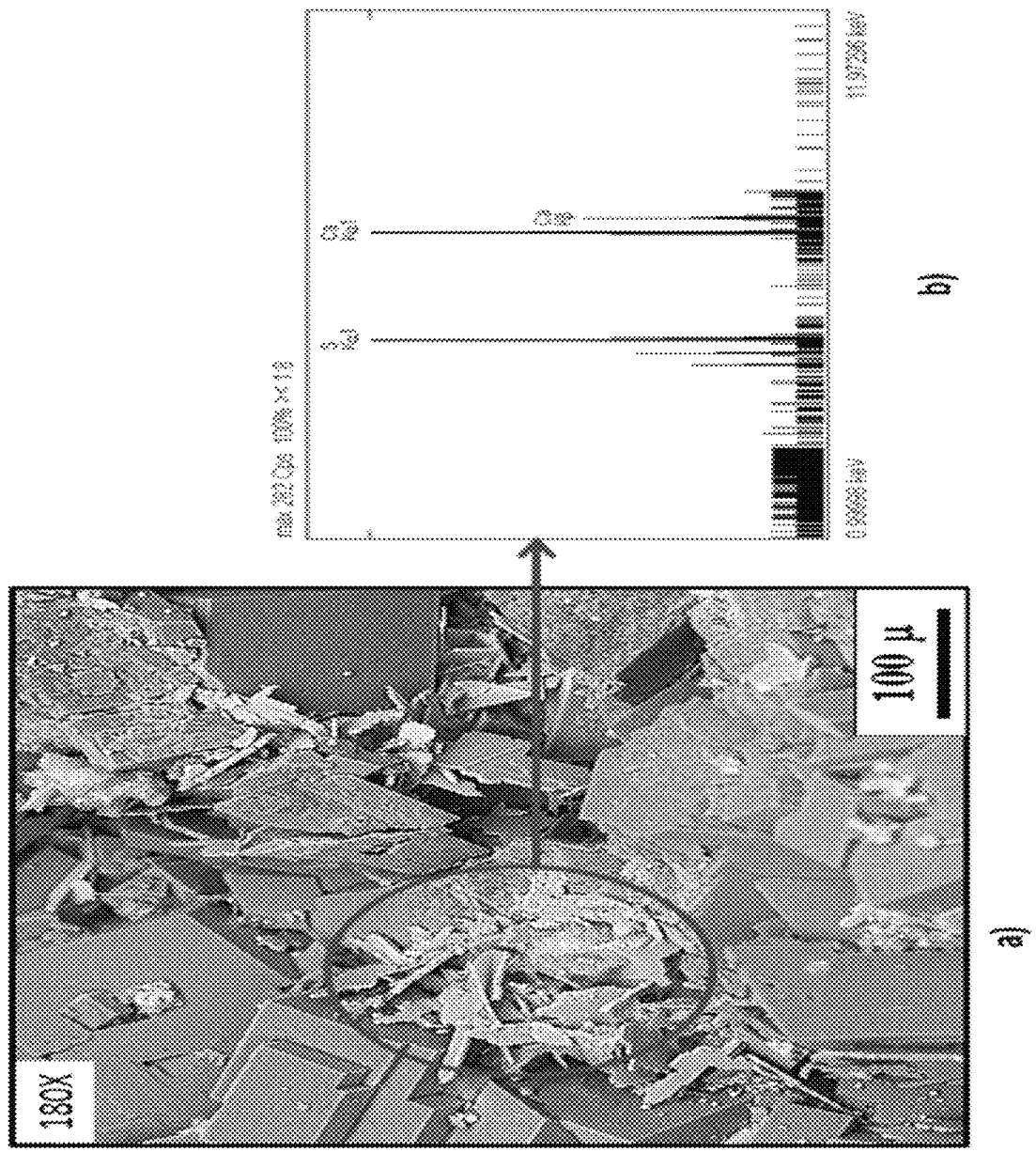
FIG. 10 shows: a) Electronic microscopy image of the rock specimen and b) composition of the salts that obstructed the rock pores.

FIG. 9 shows the recovery factor behavior against the injected brine 1 pore volume. A rock specimen was taken from the stack after brine 1 injection experiment and was analyzed by scanning electron microscopy. FIG. 10 shows: a) Electronic microscopy image of the rock specimen and b) composition of the salts that obstructed the rock's pores. The image shows that what caused the damage was the precipitation of calcium sulfate due to brine 2 and brine 1 water incompatibility.

Figure 11:
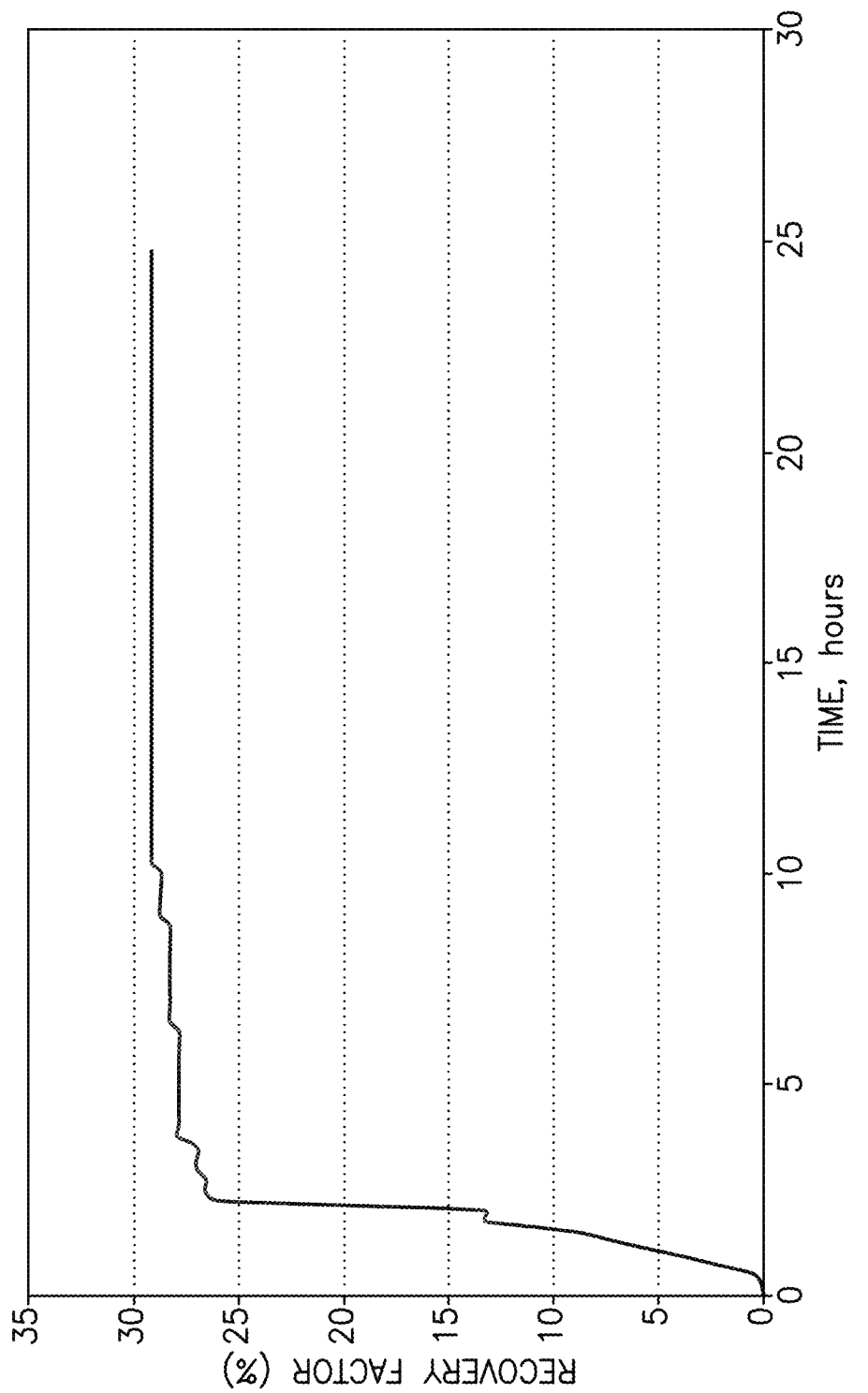
FIG. 11 shows a recovery factor versus time graph.

The same sea water injection experiment was carried out, only now added with 200 of copolymer described in Example 1 (product 1). At the conclusion of the experiment, the system of full-diameter stacked cores did not show any damage and approximately 30% oil recovery was obtained (FIG. 11), 20% additional to that obtained with injection water without chemical product. This result proves the mineral scale inhibitory effect of the copolymer of the present invention under high temperature, high pressure and high salinity conditions, characteristic of oil reservoirs.

Figure 12:
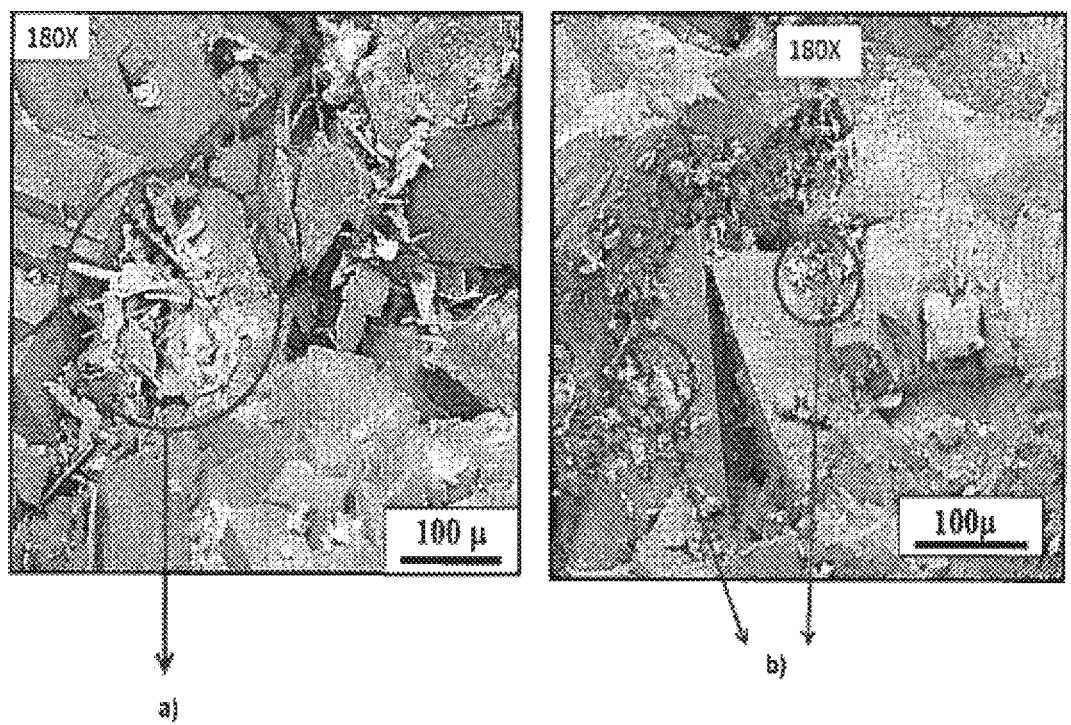
FIG. 12 shows: a) Formation rock damaged by calcium sulfate precipitation and b) Fragmentation and size reduction of calcium sulfate crystals on the formation rock.

Furthermore, a rock sample of the system of full-diameter stacked cores was taken and analyzed by scanning electron microscopy. FIG. 12 shows: a) Formation rock damaged by calcium sulfate precipitation and b) Fragmentation and reduction of formation rock calcium sulfate crystals when copolymer described in Example 1 (product 1) was injected.
h) Determination of Prevention and Remediation of Damage Caused by Calcium Sulfate Precipitation with Incompatible Mixture of Brines in a Limestone Nucleus at High Temperature, High Pressure and High Salinity Conditions.

Prevention of damage by calcium sulfate precipitation in limestone nucleus at reservoir conditions.

The damage-prevention study was carried out using brines 3 and 4, the composition of which is shown in table 16.

TABLE 16

Composition of the brines.

| | Brine 3 mg/L | Brine 4 mg/L |
|---|---|---|
| Cations | | |
| Sodium | 2949 | 2949 |
| Calcium | 3020 | — |
| Anions | | |
| Chlorides | 4551 | 4551 |
| Sulfates | — | 10080 |

Procedure.
1.—In a limestone nucleus saturated with brine 3 at 130° C. and 1500 psi, permeability was determined under such conditions.
2.—Subsequently, brine 4 enriched with chemical product was injected to the limestone nucleus saturated with brine 3 in order for them come in contact and, afterwards, permeability was measured under the temperature and pressure conditions described in point 1.

Example 18

The effect of copolymer described in Example 1 (product 1) in the prevention of damage caused by calcium sulfate precipitation was determined at 130° C. and 1500 psi in a mixture of incompatible brines (brines 3 and 4).

Permeability at the beginning of the test with the limestone nucleus saturated with brine 3 yielded a result of 53 mD, and with the mixture of brine 3 and brine 4 enriched with 200 ppm of product 1, permeability was 61 mD.

Injecting product 1 prevented damage to the limestone nucleus and there was even a 15% increase in the determined permeability.

Remediation of damage by calcium sulfate precipitation in limestone nucleus at reservoir conditions.
1.—Permeability was determined in a limestone nucleus saturated with brine 3 at 130° C. and 1500 psi.
2.—Subsequently, brine 4 was injected to the limestone nucleus saturated with brine 3 in order for the brines to come into contact and permeability was measured under the temperature and pressure conditions described in point 1.
3.—Finally, brine 4 additivated with 200 ppm of product 1 was injected to the limestone nucleus and permeability was measured.

Example 19

The effect on the remediation of damage caused by calcium sulfate precipitation was determined at 130° C. and 1500 psi in a mixture of incompatible brines that was injected subsequently with product 1. Compositions of the brines are described in Example 18.

Permeability at the beginning of the test with the limestone nucleus saturated with brine 1 yielded 58 mD and with the mixture of brines 1 and 2 yielded 45 mD.

This indicates that incompatibility of both brines generated a 23% reduction in permeability.

When product 1 was injected, permeability was 62 mD, hence, there was an increase of 6.9%.

Additionally, the determination of the adsorption of a copolymer of the present invention was carried out in order to establish if there are losses by adsorption when there is contact between the copolymer and the reservoir rock. This parameter is very important in applications aimed at the injection of chemical products in an oil reservoir since there are significant product losses due to adsorption on the rock, the product's efficiency will decrease and chemical product dosing costs will increase.

Determination of Static Adsorption on Carbonated-Type Mineral.

The methodology involves static adsorption quantitative determination by means of high performance liquid chromatography (HPLC) of a chemical product in contact with carbonated-type mineral.

Procedure:
a) Small fragments of rock are washed sequentially and at reflux temperature with the following solvents: a) Hexane b) Toluene c) Chloroform and d) Methanol.
b) The fragments of rock are dried in a stove at a temperature of 100° C. until constant weight is reached.
c) The rock (Limestone) is fragmented until converted into particles sieved in a 60 mesh.
d) A 5000 ppm solution of the chemical product is prepared in the test brine, performing dilutions to obtain 4000, 3000, 2000, 1000, 500, 200 and 100 ppm concentrations.
e) 4 g of rock particles are weighted, adding 20 mL of the chemical product different concentrations.
f) The chemical product and rock particles solution is stirred for 12 h at room temperature.
g) Once the stirring time is completed, the sample is filtered in a glass funnel using a 2 μm filter followed by a 0.5 μm filter.
h) Subsequently, a 15 μl injection was carried out in the HPLC for each concentration.

Example 20

The determination of product 1 adsorption on limestone was carried out at a concentration of 0.02% by weight (200 ppm) using the brine which characteristics are presented in Example 15.

The adsorption result for product 1 at a 200 ppm concentration was 0.6 mg of copolymer/g of rock.

Based on the environmental legislation that currently regulates the use of chemical products in the oil and chemical industry, the determination of toxicity was carried out using fresh water and sea water organisms as representative media in order to determine that the copolymers of the present invention have ecologic advantages in addition to their great performance in the previously described applications.

Assessment of Acute Toxicity with *Daphnia magna* and *Artemia franciscana*.

This method is applicable to acute toxicity assessment in water and water soluble substances. In fresh water bodies, industrial and municipal wastewater, agricultural runoff and pure or combined substances or lixiviates and the solubilizable fraction in soils and sediments.

Within the cladocera group, the *Daphnia* gender species are the most widely used as bioindicators in toxicity tests, due to their wide geographic distribution, the important role they play within the zooplankton community, and because they are easy to culture in a laboratory and they are responsive to a wide range of toxics.

The acute toxicity determination was carried out by means of the Mexican NMX-AA-087-SCFI-2010 standard, which establishes the method for measuring acute toxicity, using the freshwater organism *Daphnia magna* (Crustacea—Cladocera) and the *Artemia franciscana* organism.

Example 21

The acute toxicity determination was carried out with *Daphnia magna* for product 1, using the testing procedure established and described in the NMX-AA-087-2010 standard.

Table 17 shows the average toxicity result of a total of three repetitions, out of which a standard deviation of 0.15 and a variation coefficient of 1.92% were obtained.

The acute toxicity result indicates that product 1 is not toxic to the freshwater organism *daphnia magna*.

Moreover, based on the Mexican NRF-005-PEMEX-2009 standard, which establishes that, in order for chemical products to be suitable for use in the oil industry, they must meet the following environmental criterion.

For freshwater environments, using the *daphnia magna* microorganism, the maximum limit in toxicity units (TU) should not be higher than 20.

TABLE 17

Toxicity to *Daphnia magna*.

| Chemical product | $CL_{50}$ (ppm) | *Toxicity Category |
|---|---|---|
| Product 1 | 310 | Particularly Non-toxic |
| | 300 | Particularly Non-toxic |
| | 315 | Particularly Non-toxic |
| Average | 308.3 | Particularly Non-toxic |

*Concentration range in ppm, classification[a], category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000, non-toxic.
[a]CNS (UK) toxicity category for the application of chemical products used in hydrocarbon production in the North Sea.

Toxicity units (TU) are calculated with the $CL_{50}$ value resulting from the toxicity test, using the following formula:

$$TU = (1/CL_{50}) \times 100$$

Where:
TU=Acute toxicity units
$CL_{50}$=Inhibitor concentration (in mg/L that causes the mortality of 50% of exposed organisms).

Therefore, the copolymer of the present invention has a TU=0.32, and hence it meets the Mexican NRF-005-PEMEX-2009 standard and can be used in equipment and pipelines of oil and chemical industry that uses fresh water and is built on land.

Example 22

The acute toxicity determination was carried out with *Artemia franciscana* for product 1, using the test procedure established and described in the NMX-AA-087-2010 standard. Table 18 shows the average toxicity result of a total of three repetitions, out of which a standard deviation of 0.17 and a variation coefficient of 1.98% were obtained.

TABLE 18

Toxicity to *Artemia franciscana*.

| Chemical product | $CE_{50}$ (ppm) | *Toxicity Category |
|---|---|---|
| Product 1 | 650 | Particularly Non-toxic |
| | 660 | Particularly Non-toxic |
| | 655 | Particularly Non-toxic |
| Average | 653.3 | Particularly Non-toxic |

*Concentration range in ppm, classification[a], category 5: 0.01-0.10, extremely toxic; 4: 0.1-1.0, highly toxic; 3: 1-10, moderately toxic; 2: 10-100, slightly toxic; 1: 100-1000, particularly non-toxic and 0: >1000, non-toxic.
[a]CNS (UK) toxicity category for the application of chemical products used in hydrocarbon production in the North Sea.

The acute toxicity result indicates that product 1 is particularly non-toxic to the *artemia franciscana* organism.

Moreover, based on the Mexican NRF-005-PEMEX-2009 standard, which establishes that, in order for chemical products to be suitable for use in the oil industry, they must meet the following environmental criterion.

For sea water environments, using the *artemia franciscana* microorganism, the maximum limit in toxicity units (TU) should not be higher than 2.

Therefore, the copolymer of the present invention has a TU=0.15, and hence it meets Mexican NRF-005-PEMEX-2009 standard and can be used in equipment and pipelines of oil and chemical industry that uses sea water or formation water from oil reservoirs and that is built offshore.

What is claimed is:

1. A process for producing random copolymers from a monomer mixture consisting of itaconic acid and/or its isomers and sodium alkenyl sulfonates by a polymerization process in an aqueous solution via free radicals at an acidic pH, wherein said copolymer has the following structural formula:

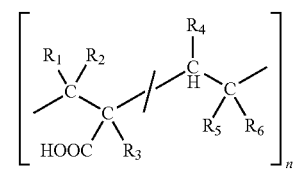

where: $R_1$ is —H or —$CH_3$, $R_2$ is —H, —$CH_2COOH$, or COOH, $R_3$ is —$CH_2COOH$, or H, $R_4$ is —H, $R_5$ is —H or —$CH_3$, $R_6$ is —$SO_3Na$, —$CH_2SO_3Na$, —CONHC$(CH_3)_2CH_2SO_3Na$, or $C_6H_4SO_3Na$, n is between 2 to 75;

said process comprising the steps of a) dilution of the itaconic acid and/or isomer thereof and sodium alkenyl sulfonate monomers in an aqueous medium; b) adding an iron salt as a free radical-formation promoter; c) adding an initiator at a controlled volume of flow and controlling the temperature, and d) agitation of the resulting mixture at constant temperature and atmospheric pressure to obtain said copolymer.

2. The process according to claim 1, wherein the initiator is a redox system.

3. The process according to claim 2, wherein the redox system comprises initiators selected from the group consisting of hydrogen peroxide, sodium persulfate, potassium persulfate and ammonium persulfate, and iron salts selected from the group consisting of ferrous ammonium sulfate and ferric ammonium sulfate.

4. The process according to claim 2, wherein the redox system is hydrogen peroxide and ferric ammonium sulfate.

5. The process according to claim 2, wherein the initiator is added at a percent ratio by weight with regard to the sum of the monomer weight of 1 to 50%.

6. The process according to claim 1, wherein the iron salt is added at a percent ratio by weight with regard to the sum of the monomer weight of 0.01 to 1%.

7. The process according to claim 1, wherein the solution pH is within the range of 1.0 to 3.5.

8. The process according to claim 7, wherein the temperature of the process is within the range of 50 to 100° C.

9. The process according to claim 1, wherein a reaction time is within the range of 4 to 12 hours.

10. The process according to claim 1, wherein the itaconic acid isomer is selected from the group consisting of cis-glutaconic acid, trans-glutaconic acid, citraconic acid and mesaconic acid.

11. A process for producing random copolymers from a monomer mixture consisting of itaconic acid and/or its isomers and sodium alkenyl sulfonates by a polymerization process in an aqueous solution via free radicals at an acidic pH, wherein said copolymer has the following structural formula:

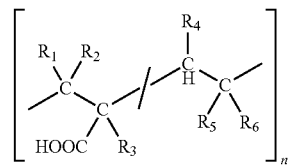

where: $R_1$ is —H or —$CH_3$, $R_2$ is —H, —$CH_2COOH$, or COOH, $R_3$ is —$CH_2COOH$, or H, $R_4$ is —H, $R_5$ is —H or —$CH_3$, $R_6$ is —$SO_3Na$, —$CH_2SO_3Na$, —CONHC$(CH_3)_2CH_2SO_3Na$, or $C_6H_4SO_3Na$, n is between 2 to 75;

said process comprising the steps of a) dilution of the itaconic acid and/or isomer thereof and sodium alkenyl sulfonate monomers in an aqueous medium; b) adding an iron salt as a free radical-formation promoter; c) adding an initiator at a controlled volume of flow and controlling the temperature, and d) agitation of the resulting mixture at constant temperature and atmospheric pressure to obtain said copolymer, and where said sodium alkenyl sulfonates monomer is selected from the group consisting of sodium salts of vinyl sulfonic acid, allyl sulfonic acid, styrene sulfonic acid, and 2-acrylamido-2-methyl-1-propanesulfonic acid.

12. The process according to claim 1, wherein the copolymer has a number average molecular weight between 500 and 20,000 AMU.

13. The process according to claim 1, wherein the stoichiometric ratio of said itaconic acid and/or isomer with respect to said sodium alkenyl sulfonate ranges between 1 to 9 and 9 to 1.

* * * * *